(12) United States Patent
Kuno

(10) Patent No.: US 9,386,188 B2
(45) Date of Patent: Jul. 5, 2016

(54) CORRUGATED SHAPE PRINTING

(71) Applicant: Masashi Kuno, Obu (JP)

(72) Inventor: Masashi Kuno, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 191 days.

(21) Appl. No.: 13/624,252

(22) Filed: Sep. 21, 2012

(65) Prior Publication Data

US 2013/0135628 A1 May 30, 2013

(30) Foreign Application Priority Data

Nov. 29, 2011 (JP) ................................. 2011-260756

(51) Int. Cl.
*G06F 15/00* (2006.01)
*G06F 1/00* (2006.01)
*H04N 1/60* (2006.01)
*B41J 3/407* (2006.01)
*B41J 25/308* (2006.01)

(52) U.S. Cl.
CPC ............. *H04N 1/6041* (2013.01); *B41J 3/4073* (2013.01); *B41J 25/308* (2013.01)

(58) Field of Classification Search
None
See application file for complete search history.

(56) References Cited

U.S. PATENT DOCUMENTS

| | | | |
|---|---|---|---|
| 5,805,176 A | 9/1998 | Satio et al. | |
| 2003/0091762 A1* | 5/2003 | Babcock et al. | 428/34.2 |
| 2004/0126164 A1* | 7/2004 | Ohyama | 400/58 |
| 2006/0158470 A1* | 7/2006 | Vanheusden et al. | 347/8 |
| 2007/0097439 A1* | 5/2007 | Yamada | 358/3.1 |
| 2007/0247505 A1* | 10/2007 | Isowa | B41J 3/407 347/101 |
| 2008/0105151 A1* | 5/2008 | Gefke | 101/424.1 |
| 2009/0231376 A1* | 9/2009 | Moriya | 347/14 |
| 2009/0231606 A1* | 9/2009 | Kawai et al. | 358/1.9 |
| 2010/0053650 A1* | 3/2010 | Yamamoto | 358/1.9 |
| 2010/0329710 A1* | 12/2010 | Yamazaki | 399/49 |

FOREIGN PATENT DOCUMENTS

| | | |
|---|---|---|
| JP | 11138923 A | 5/1995 |
| JP | 7285251 A | 10/1995 |
| JP | H09193368 A | 7/1997 |
| JP | H10138463 A | 5/1998 |

(Continued)

OTHER PUBLICATIONS

Aug. 11, 2015—(JP) Office Action—App 2011-260756—Partial English Translation.

*Primary Examiner* — John Wallace
(74) *Attorney, Agent, or Firm* — Banner & Witcoff, Ltd.

(57) ABSTRACT

A print execution unit may convey a sheet in a second direction intersecting with a first direction, in a state in which the sheet is deformed into a corrugated shape along the first direction. A print control apparatus may generate corrected image data from input image data by performing a correction process using correction data, and supply the corrected image data to the print execution unit. The correction process may be performed such that a density of first-type printed partial images printed in first-type areas on a sheet is different from a density of second-type printed partial images printed in second-type areas on an assumption that the input image data represents an image having constant tone values and the sheet is conveyed in a flat state without deformation. The first-type areas and the second-type areas extend along the second direction and are alternately arranged along the first direction.

12 Claims, 21 Drawing Sheets

(56) References Cited

FOREIGN PATENT DOCUMENTS

| JP | 2001261188 A | 9/2001 |
| JP | 2003040507 A | 2/2003 |
| JP | 2004-017586 A | 1/2004 |
| JP | 2004106978 A | 4/2004 |
| JP | 2004122609 A | 4/2004 |
| JP | 2006-192636 A | 7/2006 |
| JP | 2007059972 A | 3/2007 |

* cited by examiner

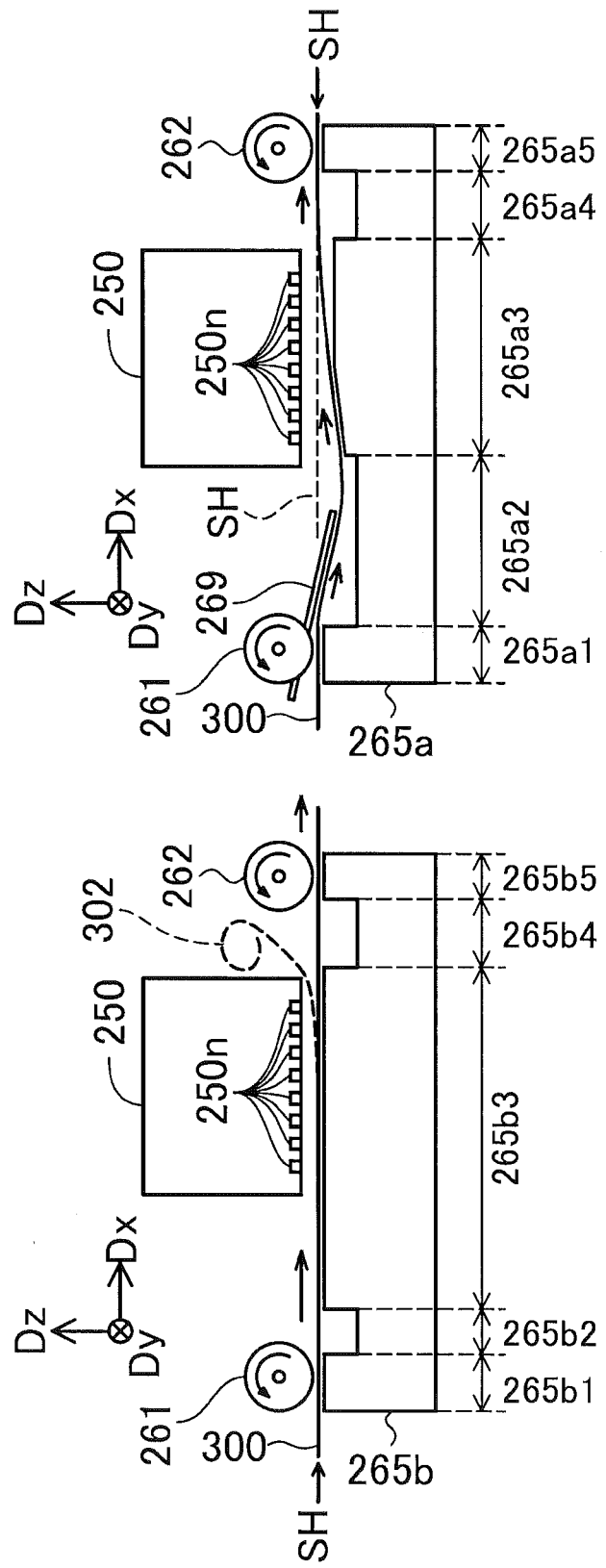

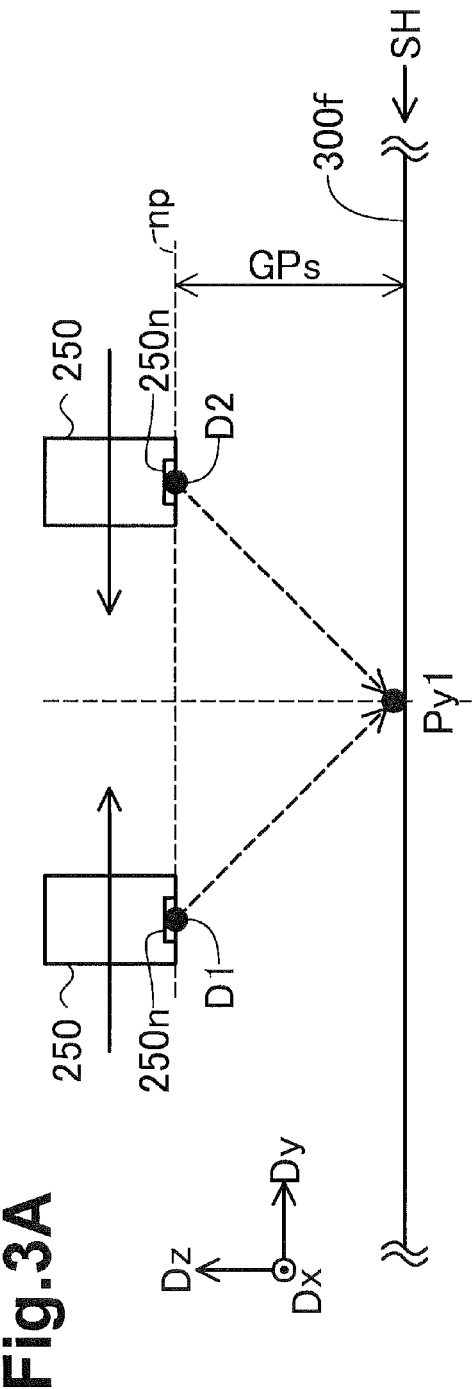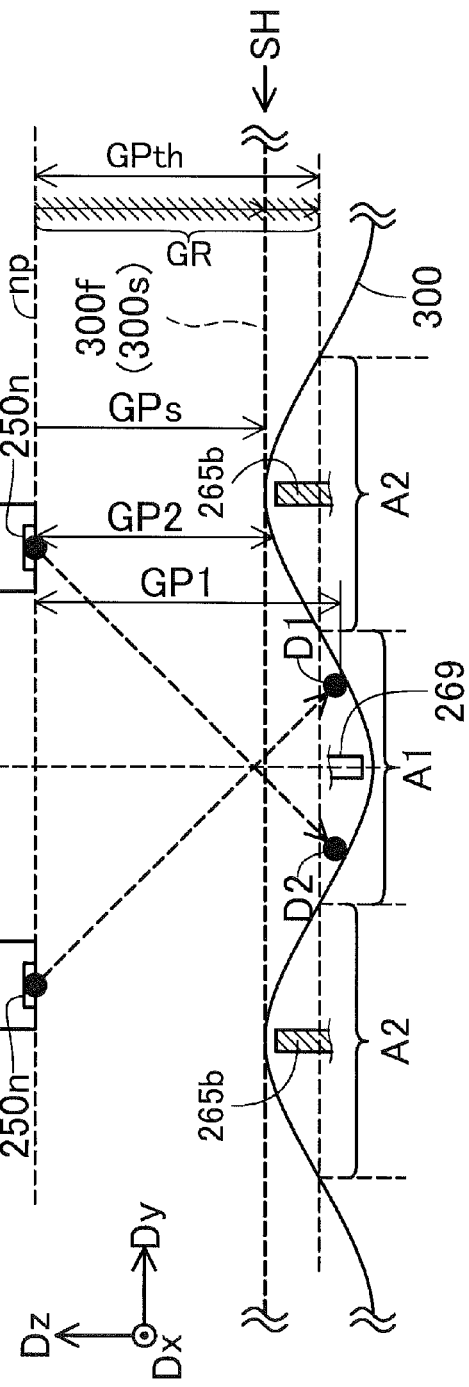

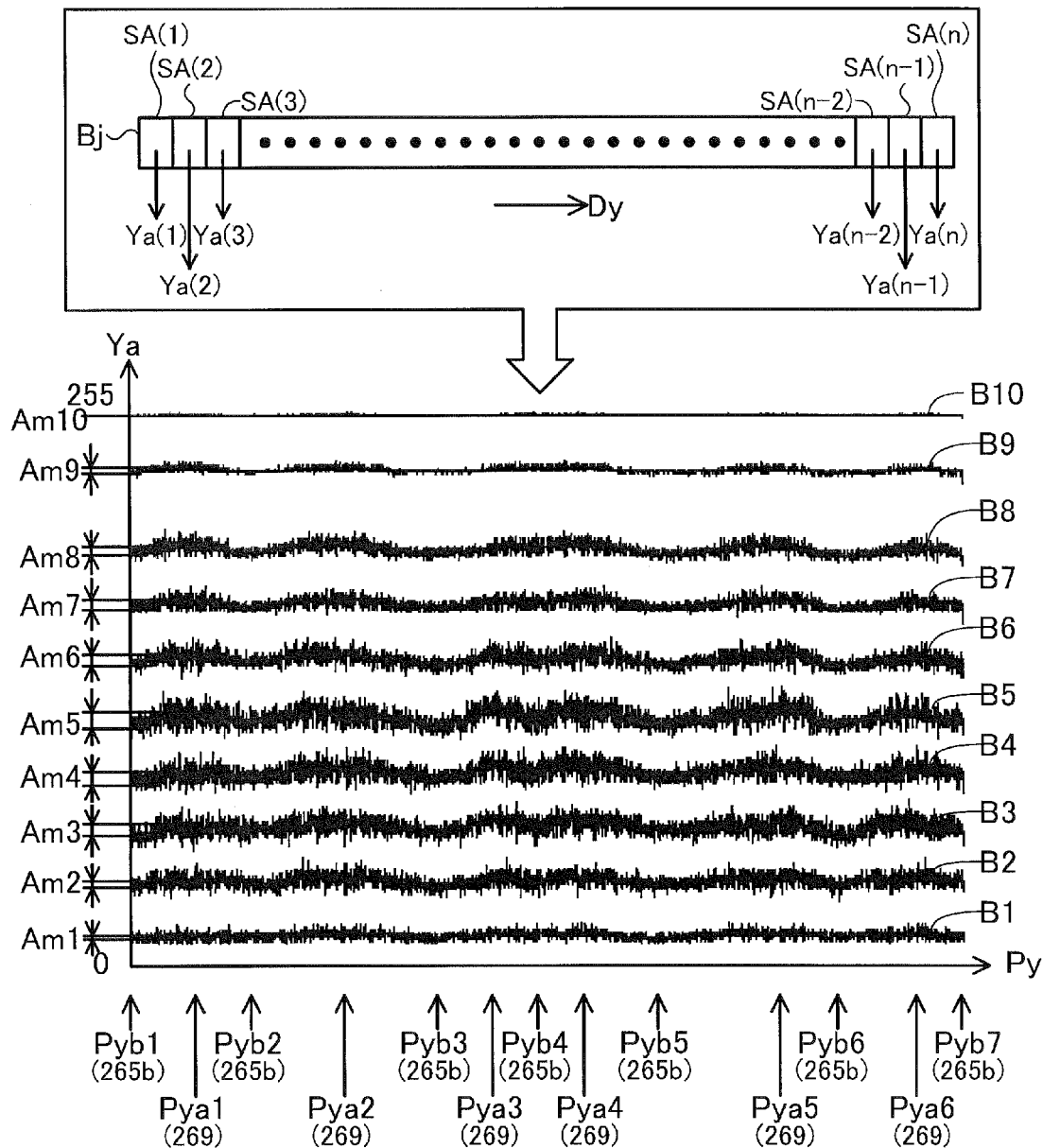

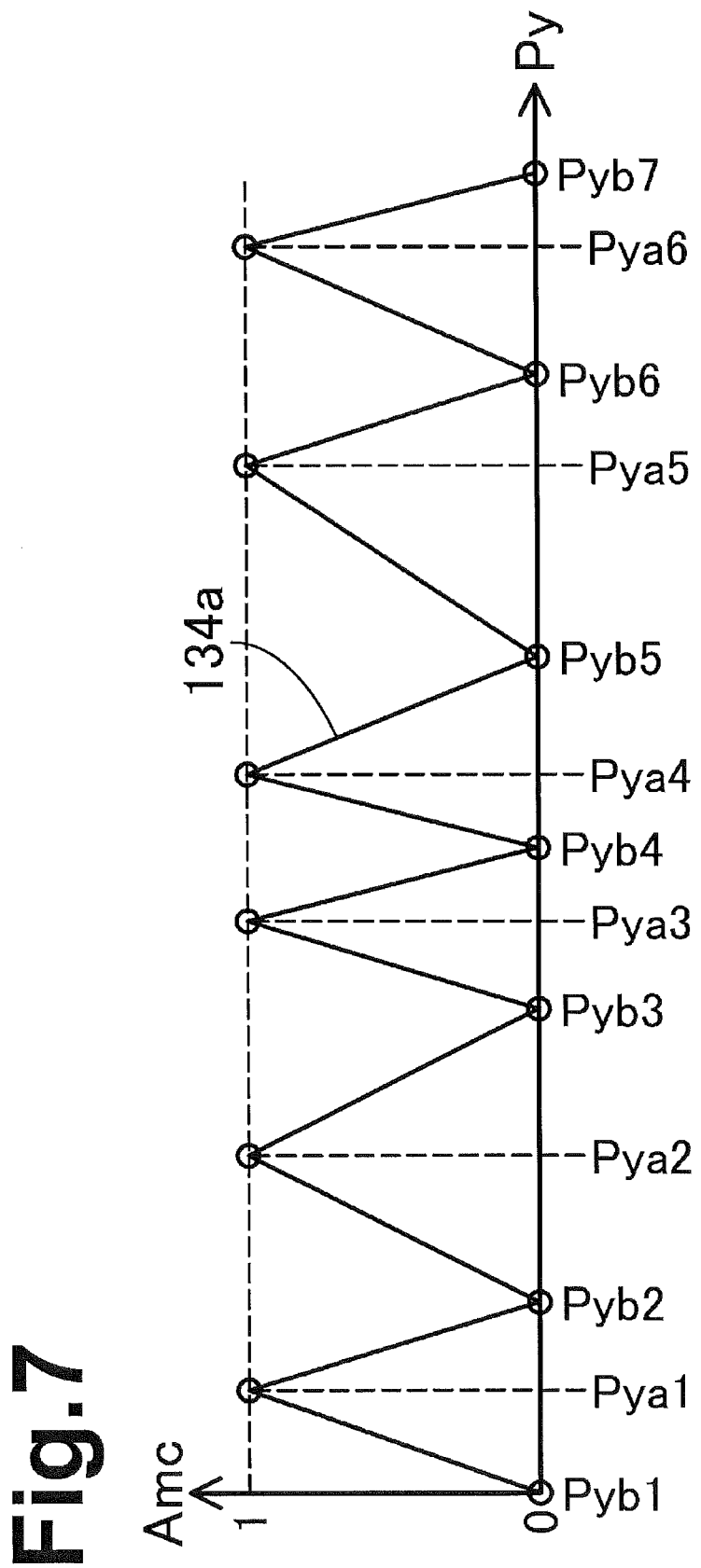

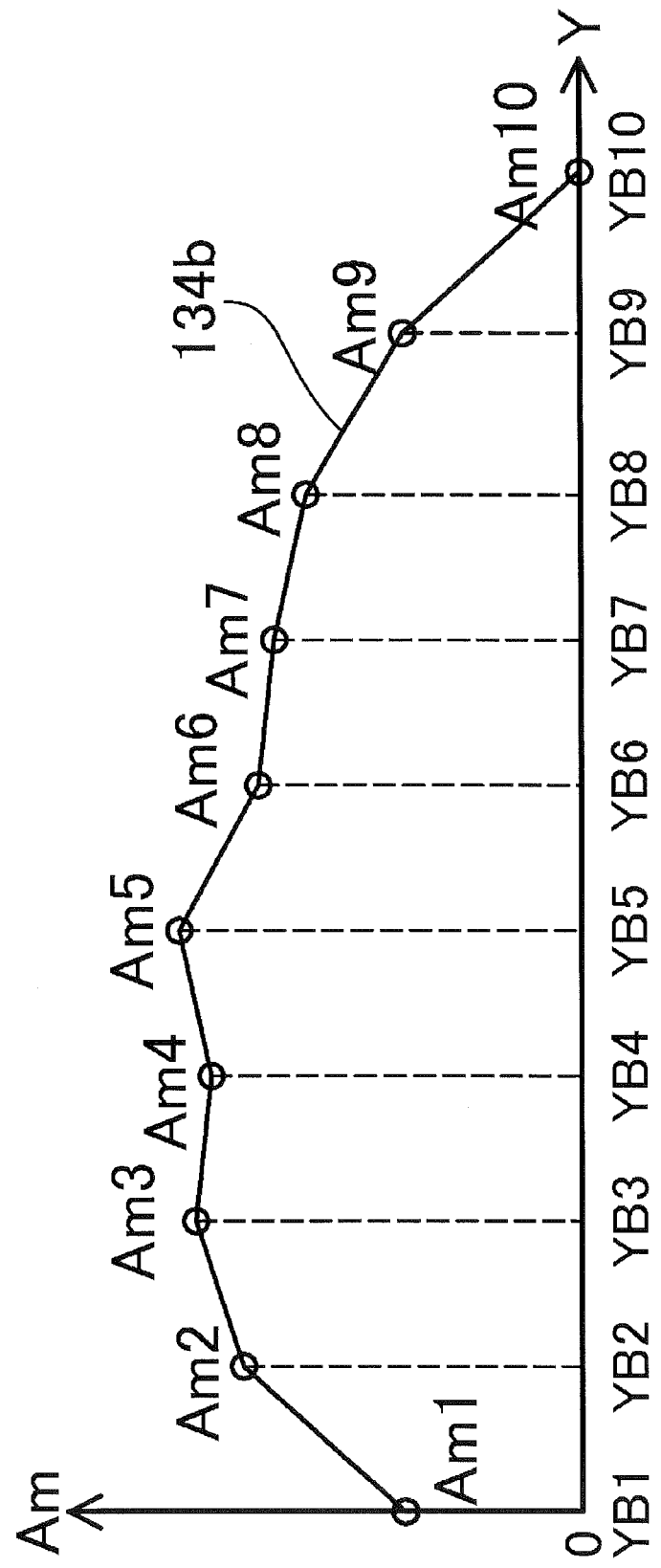

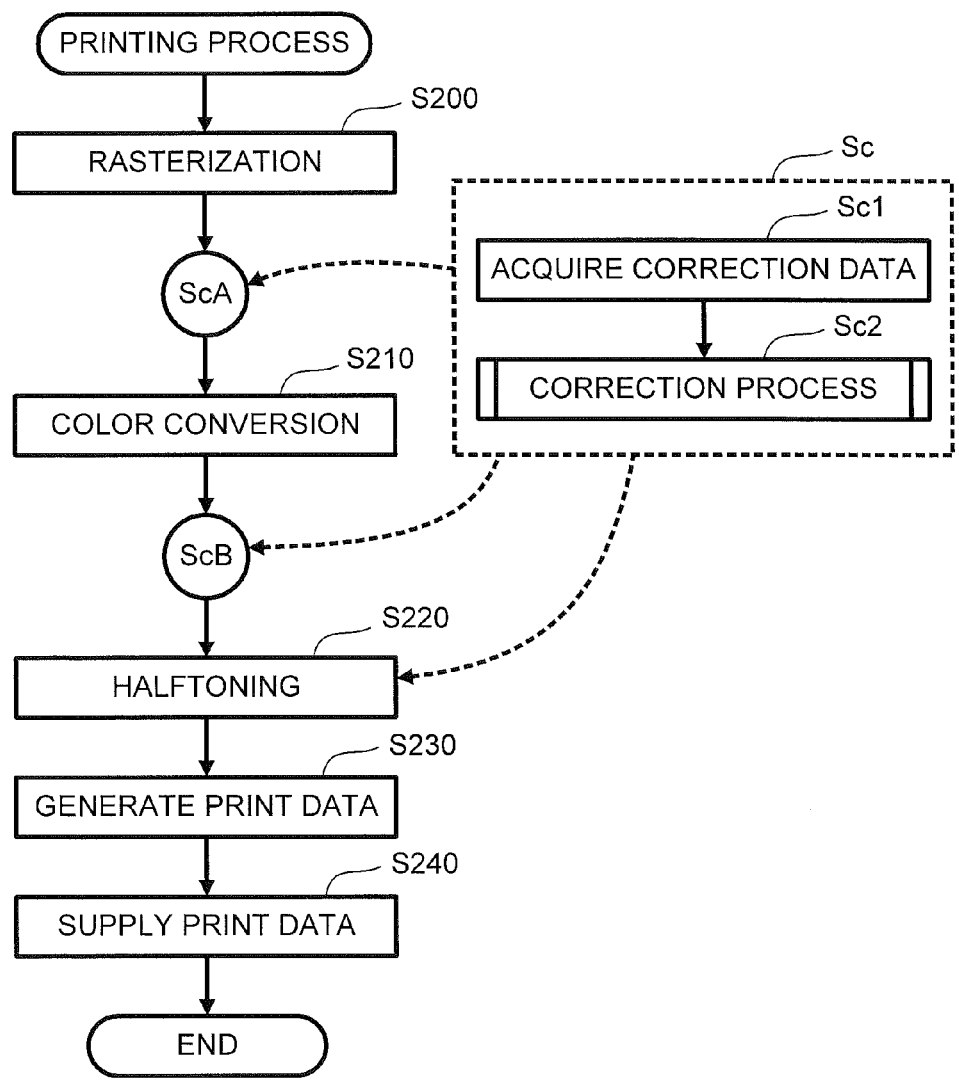

SECOND EMBODIMENT

SECOND EMBODIMENT

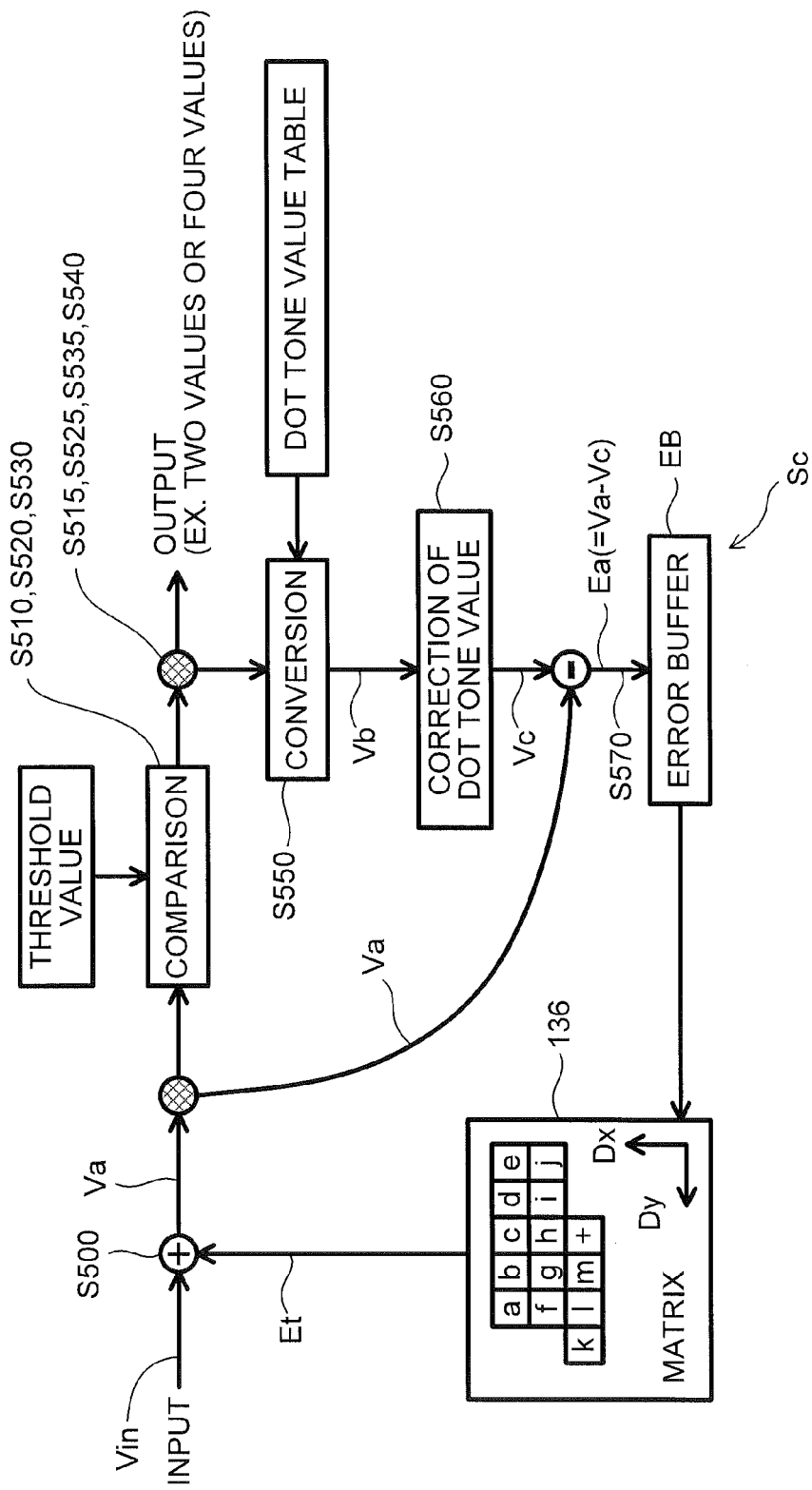
Fig.14 THIRD EMBODIMENT

THIRD EMBODIMENT

THIRD EMBODIMENT

Fig. 17 FOURTH EMBODIMENT

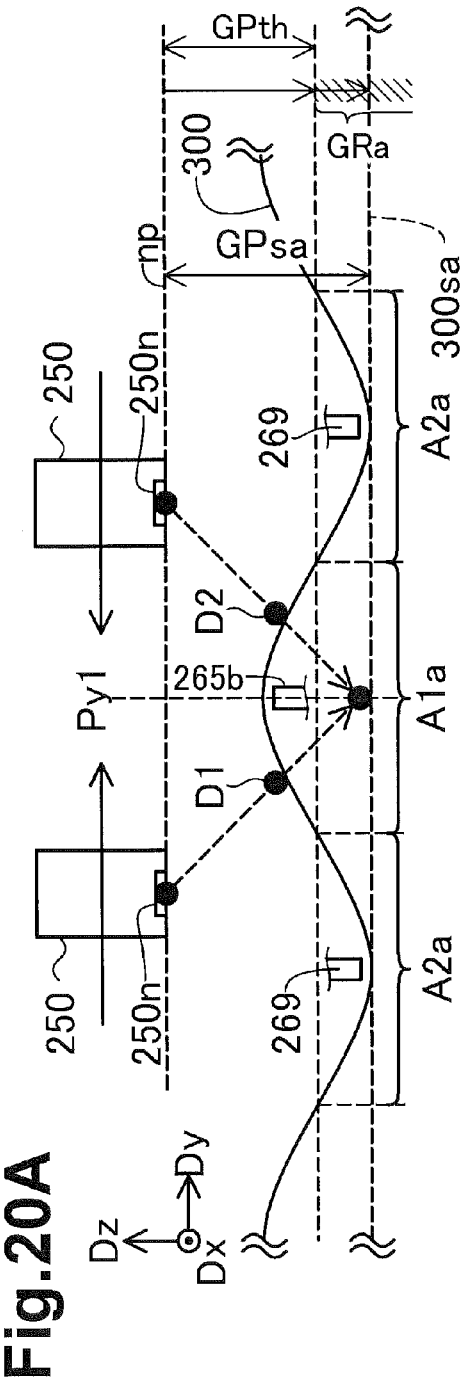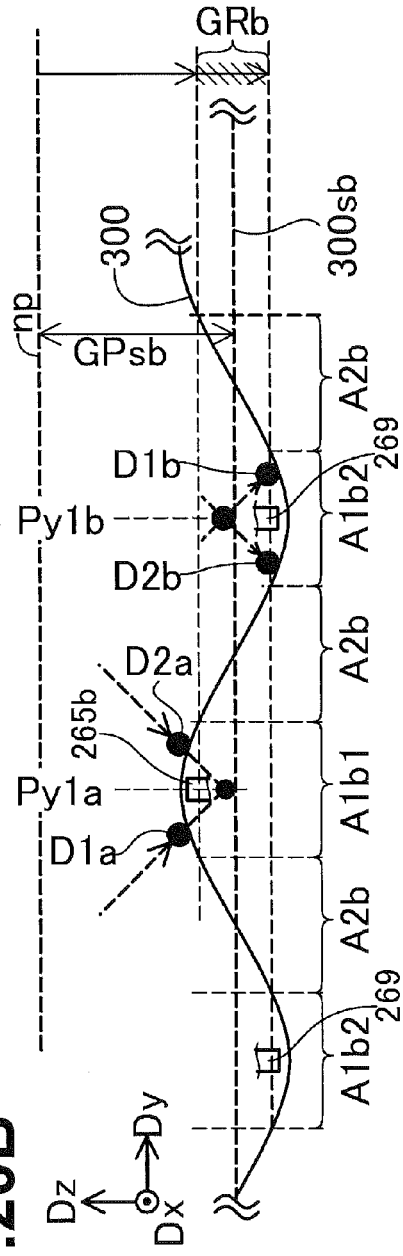

CORRUGATED SHAPE PRINTING

CROSS-REFERENCE TO RELATED APPLICATION

The present application claims priority from Japanese Patent Application No. 2011-260756, filed on Nov. 29, 2011, which is incorporated herein by reference.

BACKGROUND

1. Technical Field

The present application relates to image processing for printing and, more particularly, to image processing when a sheet is conveyed in a state in which the sheet is deformed in the printing.

2. Related Art

Printing in which ink dots are formed on a recording medium (for example, sheets of paper) is known. In such printing, the recording medium can come off from a platen toward a recording head due to the formation of the ink dots. For example, the recording medium that is curled can come off from the platen toward the recording head. Technologies to suppress such floating of the recording medium are proposed in order to achieve high-quality printing results. For example, Japanese Unexamined Patent Application Publication No. Hei 11-138923 proposes a technology to make a recording medium into a corrugated shape so as to prevent the recording medium from floating toward the recording head.

SUMMARY

When a recording medium (such as a sheet) is conveyed in the state in which the sheet is deformed into the corrugated shape, the distance between print head and the sheet varies depending on a position on the sheet. As a result, unevenness can possibly occur in printed image due to the deformation of the sheet into the corrugated shape. Features described herein relate generally to printing on sheets that have been corrugated in some fashion. In various embodiments, corrections may be made to an input image to account for variations arising due to the corrugation of the sheet. In some embodiments, the corrections can include adjusting pixel densities and color values.

Other objects, features, and advantages will be apparent to persons of ordinary skill in the art from the following detailed description and the accompanying drawings.

BRIEF DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIGS. 2A through 2D are diagrams for describing the printing apparatus 600.

FIGS. 3A and 3B are diagrams for describing positions on which droplets adhere.

FIG. 6 is a diagram for describing outline of analysis.

FIG. 7 is a graph indicating first correction data 134*a* (e.g. amplitude coefficient data 134*a*).

FIG. 8 is a graph representing second correction data 134*b* (e.g. amplitude data 134*b*).

FIG. 9 is a flow chart showing a printing process.

FIG. 14 schematically shows a halftoning process in a third embodiment.

FIGS. 20A and 20B are diagrams for describing another example of a reference gap.

DESCRIPTION OF EMBODIMENTS

A. First Embodiment

Figure 1:
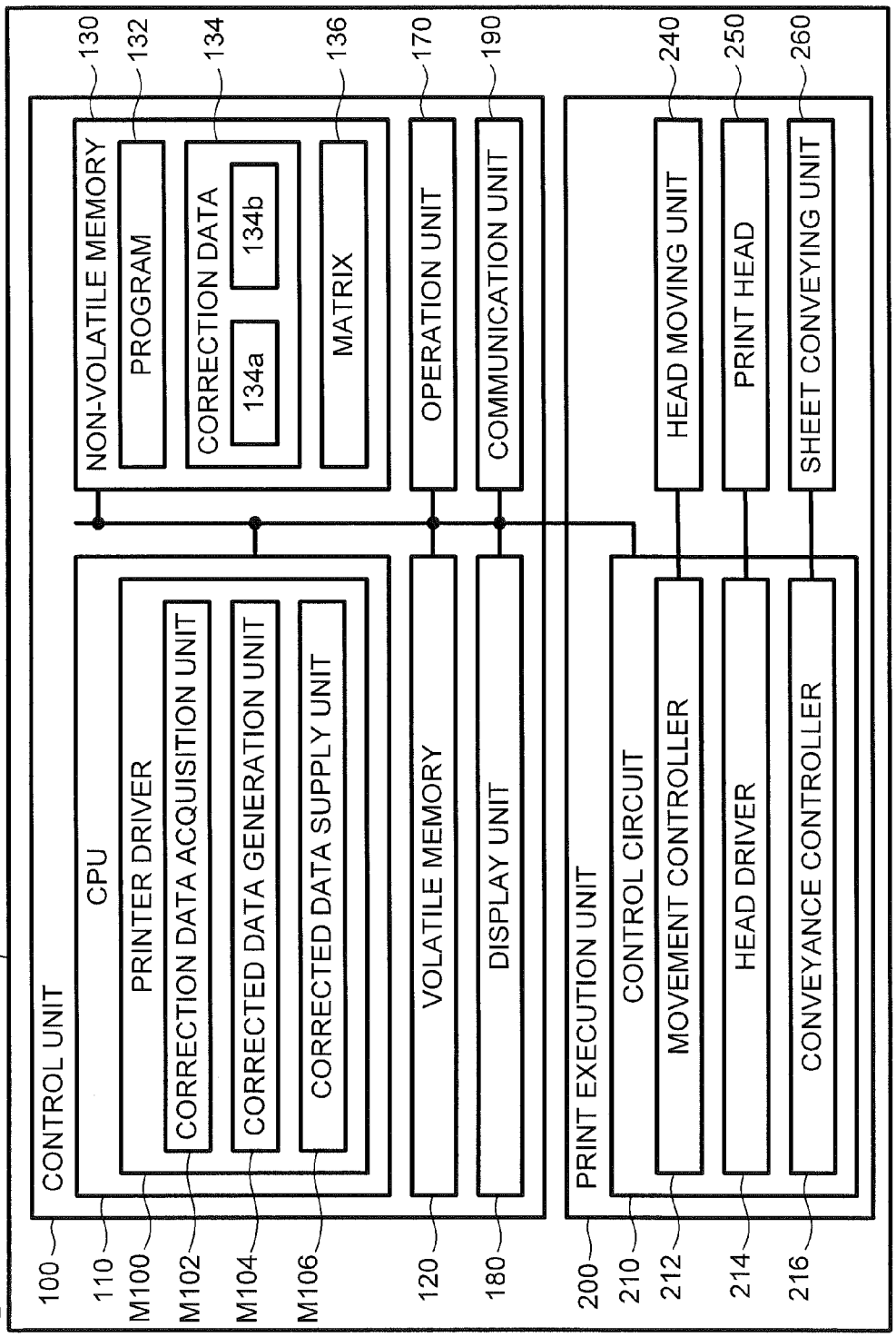
FIG. 1 is a block diagram showing the configuration of a printing apparatus 600.

Exemplary embodiments of the features described herein will herein be described with reference to the attached drawings. FIG. 1 is a block diagram showing the configuration of a printing apparatus 600. The printing apparatus 600 includes a control unit 100 and a print execution unit 200.

The control unit 100 is a computer that controls the operation of the printing apparatus 600. The control unit 100 includes a central processing unit (CPU) 110, a volatile memory 120 such as a Dynamic Random Access Memory (DRAM), a non-volatile memory 130 such as an Electrically Erasable and Programmable Read Only Memory (EEPROM), an operation unit 170 such as a touch panel, a display unit 180 such as a liquid crystal display, and a communication unit 190 that is an interface for communication with an external apparatus. The communication unit 190 may be, for example, a universal serial bus (USB) interface or an interface conforming to Institute of Electrical and Electronic Engineers (IEEE) 802.3.

The non-volatile memory 130 stores a program 132, correction data 134, and a matrix 136. The correction data 134 includes first correction data 134*a* and second correction data 134*b*. Note that the correction data 134 may be referred to as correction integrated data 134. The CPU 110 executes the program 132 to realize various functions including the function of a printer driver M100. The printer driver M100 uses image data to be printed (also referred to as "target image data") to cause the print execution unit 200 to perform printing. The target image data is supplied from, for example, an external apparatus (e.g. a computer or a USB flash memory) to the printing apparatus 600.

In the present embodiment, the printer driver M100 includes a correction data acquisition unit M102, a corrected data generation unit M104, and a corrected data supply unit M106. The correction data acquisition unit M102 acquires the correction integrated data 134 from the non-volatile memory 130, as described below. The corrected data generation unit M104 performs a correction process by using the correction integrated data 134 so as to generate corrected print data (also referred to as "corrected image data") from the target image data. The corrected data supply unit M106 supplies the corrected image data to the print execution unit 200. The print execution unit 200 performs the printing in accordance with the received corrected image data.

The print execution unit 200 discharges ink droplets toward a sheet (a print medium) to form dots on the sheet. A printed image is represented by a pattern of dots. The print execution unit 200 includes a control circuit 210, a print head 250, a head moving unit 240, and a sheet conveying unit 260. Multiple nozzles (not shown) for discharging the ink droplets are provided on the bottom face of the print head 250. In the present embodiment, the print head 250 is capable of discharging ink of four colors: cyan (C), magenta (M), yellow (Y), and black (K). The sheet conveying unit 260 conveys the sheet in a predetermined conveyance direction. The head moving unit 240 moves the print head 250 in a direction orthogonal to the conveyance direction. The operation of the print head 250 to discharge the ink droplets toward the sheet while the print head 250 moves between positions opposing the sheet and the operation of the sheet conveying unit 260 to convey the sheet are repeated to advance the printing of an image. The control circuit 210 includes a movement controller 212 that controls the head moving unit 240, a head driver 214 that controls the print head 250, and a conveyance controller 216 that controls the sheet conveying unit 260. The control circuit 210 controls the head moving unit 240, the print head 250, and the sheet conveying unit 260 in accordance with the corrected image data (print data) supplied from the control unit 100.

Figure 2A:
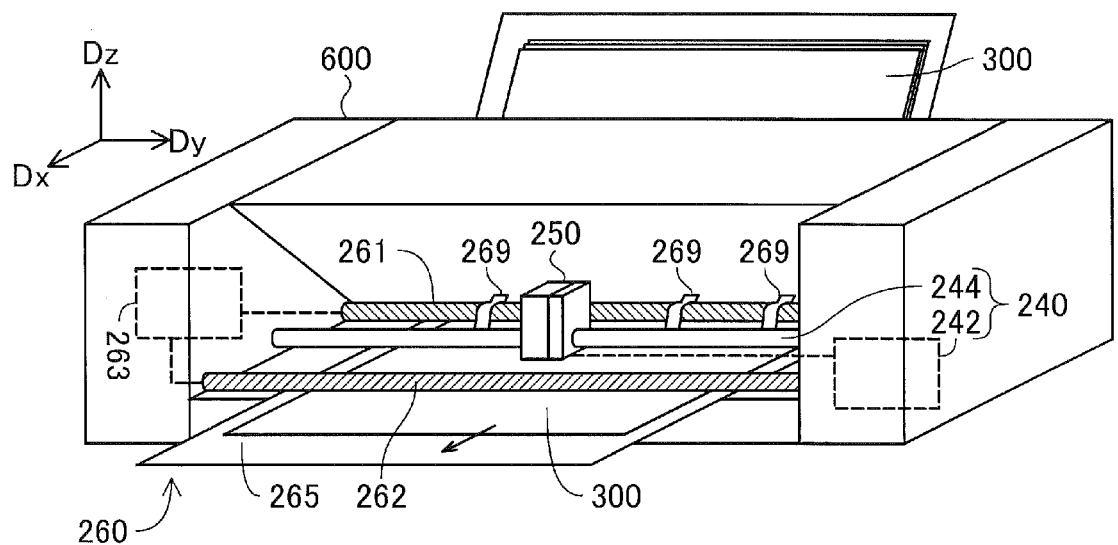

FIG. 2A is a perspective view of the printing apparatus 600. Three directions Dx, Dy, and Dz are shown in FIG. 2A. The two directions Dx and Dy are horizontal directions and the Dz direction is the upper vertical direction. The Dy direction is orthogonal to the Dx direction. The Dy direction is parallel to the direction in which the print head 250 moves. Note that the Dy direction may also be referred to as a "first direction Dy". The Dx direction coincides with the direction in which a sheet 300 is conveyed. Note that the Dx direction may also be referred to as a "conveying direction Dx" or a "second direction Dx". The Dx direction may also be referred to as a "+Dx direction" and the direction opposite to the Dx direction may also be referred to as a "−Dx direction." The same applies to +Dy direction, −Dy direction, +Dz direction, and −Dz direction.

The sheet conveying unit 260 includes a conveyance motor 263, a first roller 261, a second roller 262, a sheet stand 265, and pressure applying portions 269. The sheet stand 265 supports the sheet 300 from the lower face of the sheet 300 almost horizontally. The two rollers 261 and 262 are arranged at positions opposing the upper face of the sheet stand 265. The first roller 261 opposes a part toward the −Dx direction of the sheet stand 265, and the second roller 262 opposes a part toward the +Dx direction of the sheet stand 265. Each of the rollers 261 and 262 is parallel to the Dy direction and is rotated and driven by the conveyance motor 263. The sheet 300 is sandwiched between the rollers 261 and 262 and the sheet stand 265 to be conveyed in the conveying direction Dx by the rotation of rollers 261 and 262.

In the present embodiment, when the printing apparatus 600 performs the printing on a rectangular sheet of a specific size (for example, a sheet of A4 size), the sheet is arranged such that the short sides of the rectangular sheet are parallel to the conveying direction Dx and the long sides of the rectangular sheet are parallel to the first direction Dy. As a result, it is possible to reduce the size of the printing apparatus 600 in the Dx direction, compared with a case in which the long sizes of the sheet is parallel to the conveying direction Dx.

The head moving unit 240 includes a movement motor 242 and a support shaft 244. The support shaft 244 is arranged between the first roller 261 and the second roller 262 and extends in parallel to the first direction Dy. The support shaft 244 supports the print head 250 such that the print head 250 is capable of sliding along the support shaft 244. The movement motor 242 is connected to the print head 250 with a belt (not shown). The movement motor 242 moves the print head 250 in parallel to the first direction Dy. In the present embodiment, the head driver 214 (FIG. 1) drives the print head 250 while the print head 250 is moving in the first direction Dy and while the print head 250 is moving in the direction (the −Dy direction) opposite to the first direction Dy so as to cause the print head 250 to discharge the ink droplets (i.e. bidirectional printing).

Figure 2B:
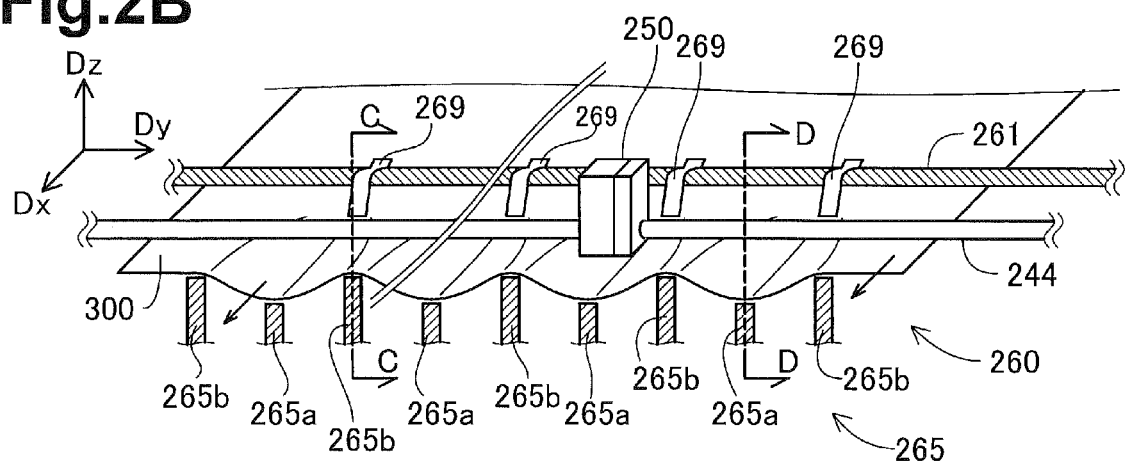

FIG. 2B is an enlarged perspective view of the head moving unit 240 and the sheet conveying unit 260. A cross section vertical to the conveying direction Dx of the sheet stand 265 (a cross section at a position between the two rollers 261 and 262) is also shown in FIG. 2B. As shown in FIG. 2B, the sheet stand 265 includes multiple low supports 265a and multiple high supports 265b. The high supports 265b support the sheet 300 at positions higher than positions where the low supports 265a support the sheet 300. The low supports 265a and the high supports 265b are alternately arranged along the first direction Dy. FIG. 2C shows a cross section of the high support 265b. FIG. 2D shows a cross section of the low support 265a. Both the cross sections shown in FIG. 2C and FIG. 2D are parallel to the conveying direction Dx and the upper vertical direction Dz.

As shown in FIG. 2C, the high support 265b includes five parts 265b1 to 265b5 arranged from the −Dx direction to the +Dx direction. The first part 265b1 opposes the first roller 261. The third part 265b3 opposes the print head 250 (multiple nozzles 250n). The fifth part 265b5 opposes the second roller 262. These three parts 265b1, 265b3, and 265b5 each have the upper face of the same height and each support the sheet 300 from the lower face of the sheet 300. Note that the height of the upper faces of these three parts may also be referred to as a "reference height SH". The remaining two parts 265b2 and 265b4 are recessed downward from the reference height SH and are apart from the sheet 300. The print head 250 includes the multiple nozzles 250n having different positions in the conveying direction Dx, as shown in FIG. 2C and FIG. 2D. In the present embodiment, the multiple nozzles 250n are provided for each of the CMYK colors of ink.

As shown in FIG. 2D, the low support 265a includes five parts 265a1 to 265a5 arranged from the −Dx direction to the +Dx direction. The first part 265a1 and the fifth part 265a5 are similar to the first part 265b1 and the fifth part 265b5 in FIG. 2C, respectively. The third part 265a3 opposes the print head 250 (the multiple nozzles 250n), like the third part 265b3 in FIG. 2C. However, the height of the upper face of the third part 265a3 is lower than the reference height SH. At least a portion of the upper face of the third part 265a3 is tilted upward from the −Dx side to the +Dx side. In other words, the height of the third part 265a3 is increased with the decreasing distance to the second roller 262. The remaining two parts 265a2 and 265a4 are recessed downward from the reference height SH and are apart from the sheet 300.

The pressure applying portion 269 is arranged above the second part 265a2. The pressure applying portion 269 obliquely extends downward from a position opposing the upper face of the first part 265a1 toward the conveying direction Dx side. The height of the end at the conveying direction +Dx side of the pressure applying portion 269 is lower than the reference height SH. The sheet 300 fed between the first roller 261 and the first part 265a1 is curled by the pressure applying portion 269 to be conveyed downward with respect to the reference height SH. At the conveying direction +Dx side of the pressure applying portion 269, the sheet 300 is supported by the third part 265a3 on its lower face to be gradually close to the reference height SH. However, the height of the sheet 300 is lower than the reference height SH at positions opposing the print head 250 (the multiple nozzles 250n). At the conveying direction +Dx side of the third part 265a3, the sheet 300 is sandwiched between the second roller 262 and the fifth part 265a5.

As shown in FIG. 2B, the high supports 265b and sets of the pressure applying portion 269 and the low support 265a are alternately arranged along the first direction Dy in the present embodiment. Accordingly, the sheet conveying unit 260 conveys the sheet 300 in the conveying direction Dx in a state in which the sheet 300 is deformed, between the first roller 261 and the second roller 262, into a corrugated shape along the first direction Dy intersecting with the conveying direction Dx. The sheet 300 is deformed into the corrugated shape in order to inhibit the sheet 300 from floating up from the sheet stand 265 toward the print head 250 due to curling of the sheet 300. Provided that the sheet 300 is conveyed in a flat state without the deformation, the sheet which has received the ink droplets from the nozzles 250n can possibly be deformed unintentionally in a manner shown by reference numeral 302 in FIG. 2C. Such unintentional deformation can cause a printing failure. In particular, the short sides of the rectangular sheet are parallel to the conveying direction Dx and the long sides thereof are parallel to the first direction Dy in the present embodiment. In this case, an unintentional deformation is likely to occur, compared with the case in which the long sides of the rectangular sheet are parallel to the conveying direction Dx. Accordingly, the printing apparatus 600 of the present embodiment deforms the sheet 300 into the corrugated shape along the first direction Dy intersecting with the conveying direction Dx in order to suppress the unintentional deformation.

FIGS. 3A and 3B show positions where first and second droplets D1 and D2 discharged from the print head 250 adhere on the sheet (positions in the first direction Dy). The first droplet D1 is discharged from the print head 250 moving in the +Dy direction and the second droplet D2 is discharged from the print head 250 moving in the −Dy direction. FIG. 3A shows a hypothetical case in which the printing is performed on a flat sheet 300f (which may also be referred to as a "reference sheet 300f") which is not deformed. FIG. 3B shows a case in which the printing is performed on the sheet 300 which is deformed into the corrugated shape according to the present embodiment.

The nozzles 250n discharge the droplets D1 and D2 toward the lower vertical direction. The nozzles 250n are horizontally moved above the sheet 300 or 300f when the nozzles 250n discharge the droplets D1 and D2. Accordingly, viewed from the sheet 300 or 300f, the droplets D1 and D2 are obliquely projected toward the direction in which the print head 250 is moving. As shown in FIG. 3A, in order to form a dot at the same target position Py1, the print head 250 that is moving to the +Dy direction discharges the first droplet D1 at a position toward the −Dy direction with respect to the target position Py1, and the print head 250 that is moving to the −Dy direction discharges the second droplet D2 at a position toward the +Dy direction with respect to the target position Py1. The discharge timing of the droplets D1 and D2 are adjusted in the above manner.

A gap GPs in FIG. 3A indicates the gap between a nozzle plane np and the reference sheet 300f. The nozzle plane np is a plane that includes the positions of the multiple nozzles 250n and that includes positions where the nozzles 250n that are moving are to pass through. The nozzle plane np may be a substantially horizontal plane. The gap means the distance between the nozzle plane np and the sheet, which is measured perpendicular to the nozzle plane np. The gap GPs between the nozzle plane np and the reference sheet 300f may also be referred to as a "reference gap GPs".

As shown in FIG. 3B, the sheet 300 that is practically used is deformed into the corrugated shape along the first direction Dy. In the present embodiment, the gap between the nozzle plane np and the highest parts of the sheet 300 (the parts supported by the high supports 265b) is equal to the reference gap GPs. A plane 300s corresponding to the reference sheet 300f may also be referred to as a "reference plane 300s." The height of the reference plane 300s is equal to the reference height SH shown in FIG. 2C and FIG. 2D.

As shown in FIG. 3B, the area on the sheet 300 is grouped into first-type areas A1 and second-type areas A2 that are alternately arranged in the first direction Dy. The first-type areas A1 include the parts pressed by the pressure applying portions 269. The second-type areas A2 include the parts supported by the high supports 265b.

Also in this case, the discharge timing of the droplets D1 and D2 is adjusted on the assumption that the printing is performed on the flat reference plane 300s apart from the nozzles 250n by the reference gap GPs. The droplets D1 and D2 that are discharged in order to form dots at the target position Py1, which is the same as the one shown in FIG. 3A, are shown in FIG. 3B. In the printing on the first-type areas A1 far from the reference plane 300s, the positions on which the droplets D1 and D2 adhere are shifted from the target position Py1. The first droplet D1 adheres on a position shifted from the target position Py1 toward the direction in which the print head 250 is moving (toward the +Dy direction), and the second droplet D2 adheres on a position shifted from the target position Py1 toward the direction in which the print head 250 is moving (toward the −Dy direction). Such positional shift of the dots is increased with the increasing difference between a gap between the nozzle plane np and the sheet 300 and the reference gap GPs.

Multiple dots that are not overlapped with each other are generally formed in order to perform the printing in a target density. When the difference between the gap between the nozzle plane np and the sheet 300 and the reference gap GPs is large, part of the dots will be overlapped with other dots due to the positional shift of the dots. As a result, the density of a printed image will be lower than the target density (that is, the printed image will be brightened up). Such a shift in density in the first-type areas A1 far from the reference plane 300s is larger than that in the second-type areas A2 close to the reference plane 300s. An observer of the printed image recognizes the difference in density between the first-type areas A1 and the second-type areas A2 as unevenness in density. In order to suppress the unevenness in density, the printing apparatus 600 of FIG. 1 performs image correction using the correction integrated data 134 in image processing for the printing.

The first-type areas A1 can be discriminated from the second-type areas A2 by using the gap between the nozzle plane np and an intermediate position between the lowest part of the pressure applying portion 269 and the upper face of the high support 265b (such a gap may also referred to as a "gap threshold value GPth"). Specifically, the first-type areas A1 are areas whose gap is within a range larger than or equal to the gap threshold value GPth, and the second-type areas A2 are areas whose gap is within a range smaller than the gap threshold value GPth. The gap threshold value GPth may be, for example, a gap corresponding to a middle height between the lowest part of the pressure applying portion 269 and the upper face of the high support 265b.

The correction integrated data 134 (FIG. 1) will now be described. The correction integrated data 134 defines the amount of correction of the density to reduce the unevenness in density described above with reference to FIG. 3B. In the present embodiment, the correction integrated data 134 is stored in the non-volatile memory 130 in advance before shipment of the printing apparatus 600. The correction integrated data 134 is generated by a manufacturer of the printing apparatus 600.

Figure 4:
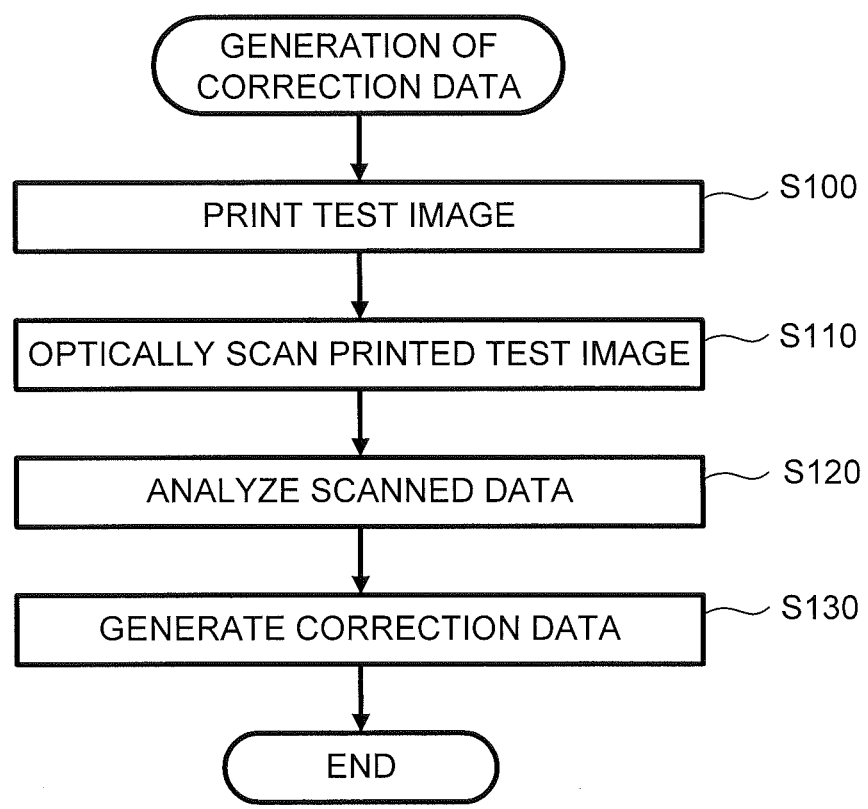
FIG. 4 is a flow chart showing a process of generating correction integrated data 134.
Figure 5A:
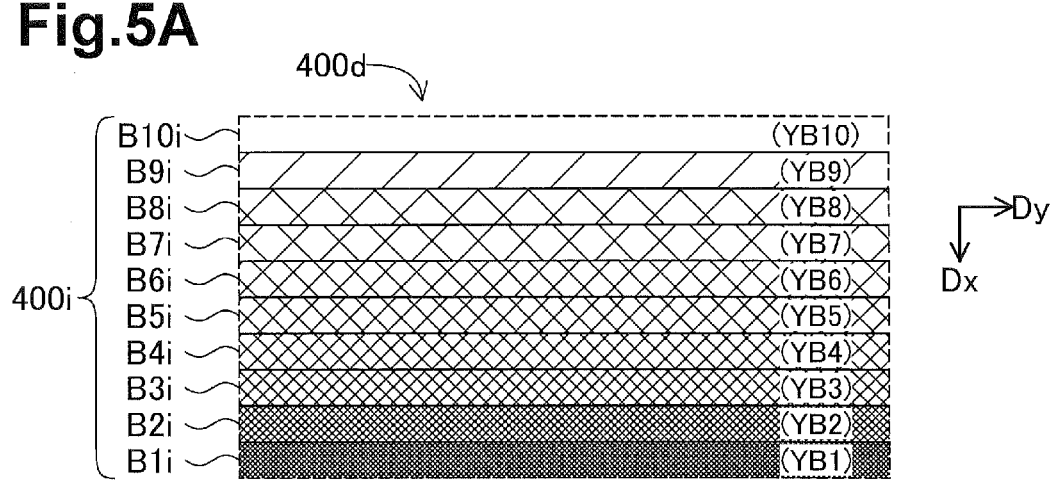
FIGS. 5A and 5B are diagrams for describing a test image.

FIG. 4 is a flow chart showing a process of generating the correction integrated data 134. In Step S100, a test image is printed. FIG. 5A is a diagram for describing test image data 400d. The test image data 400d represents a test image 400i including multiple (ten in FIG. 5A) reference images B1i to B10i. The reference images B11 to B10i are uniform gray images having different luminance values YB1 to YB10 as shown in FIG. 5A. The luminance values YB1 to YB10 are shown in the order of darkness (the luminance value YB1 has the highest density among the luminance values YB1 to YB10). Each of the reference images B1i to B10i is a rectangular image that extends along the first direction Dy when the reference image is printed. Each of the reference images B1i to B10i has a size sufficient for the reference image that is printed to cover the entire printable range of the printing apparatus 600 from the end in the −Dy direction to the end in the +Dy direction. The reference images B1i to B10i are sequentially arranged along the −Dx direction when the reference images B1i to B10i are printed. The test image data 400d includes pixel data for each of multiple pixels arranged in a matrix pattern. The pixel data of one pixel represents tone values representing a color of the pixel (e.g. the tone values of red (R), green (G), and blue (B)). Each of the reference images B1i to B10i has constant tone values.

Figure 5B:
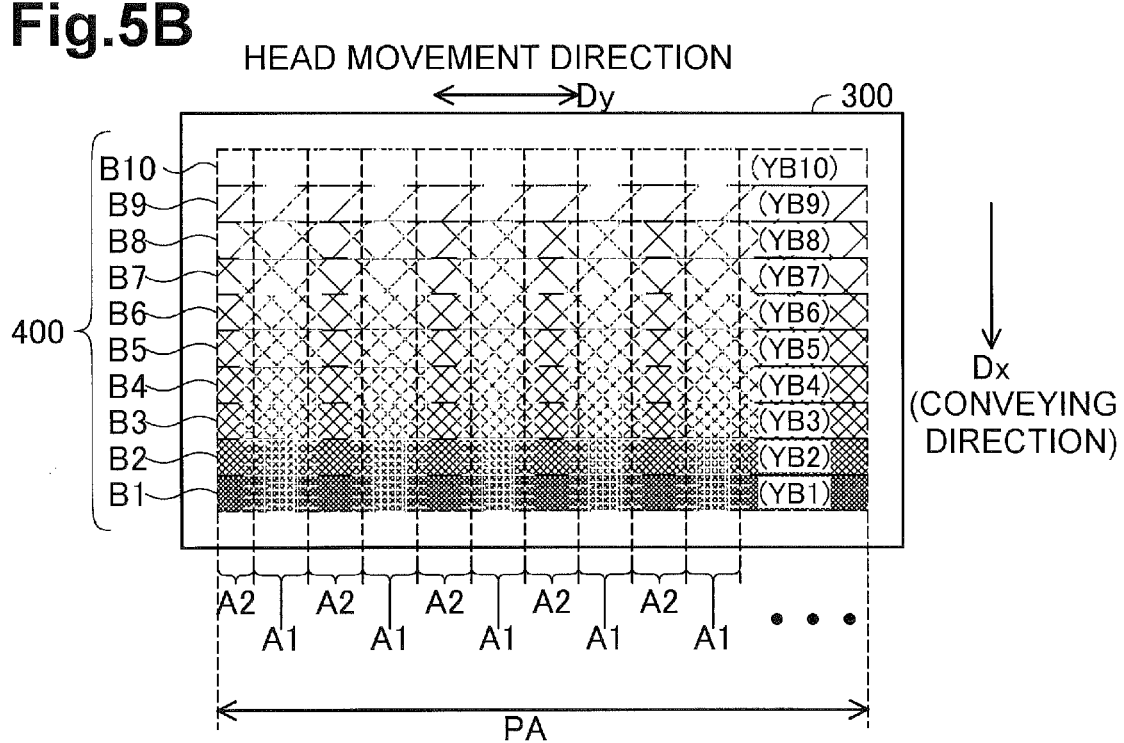

FIG. 5B is a diagram for describing a printed test image 400. The printing apparatus 600 uses the test image data 400d to print the test image 400i on the sheet 300 deformed into the corrugated shape without correcting the density (e.g. the luminance value). The image resulting from the above printing is the printed test image 400. The printed test image 400 includes multiple printed reference images B1 to B10 corresponding to the multiple reference images B1i to B10i (FIG. 5A), respectively. Each of the printed reference images B1 to B10 extends along the first direction Dy from the end in the −Dy direction to the end in the +Dy direction of a printable range PA of the printing apparatus 600. As shown in FIG. 5B, each of the printed reference images B1 to B10 includes multiple partial images printed in the multiple first-type areas A1 and multiple partial images printed in the multiple second-type areas A2. As described above with reference to FIG. 3B, the density of the first-type areas A1 is lower than that of the second-type areas A2 (that is, the images in the first-type areas A1 are brighter than those in the second-type areas A2). The sheet 300 used in the printing of the test image 400i is preferably a sheet of a maximum size available in the printing apparatus 600. Such a sheet can be used to acquire the printed test image 400 covering the entire printable range PA from the end in the −Dy direction to the end in the +Dy direction. Since the printed test image covering the entire range in the first direction Dy can be used to determine the correction integrated data 134, it is possible to acquire the correction integrated data 134 appropriate for various positions within the printable range PA.

In Step S110 of FIG. 4, the printed test image 400 is optically scanned. In the present embodiment, a so-called optical scanner scans the printed test image 400 to generate image data (which may also be referred to as a "scanned data") representing the printed test image 400. The scanned data includes pixel data for each of multiple pixels arranged in a matrix pattern. The pixel data of one pixel represents tone values representing a color of the pixel (e.g. the tone values of red (R), green (G), and blue (B)).

In Step S120, the scanned data is analyzed. FIG. 6 is a diagram for describing the outline of the analysis. The scanned data includes multiple pieces of reference image data representing the multiple printed reference images B1 to B10 shown in FIG. 5B. Reference image data Bj shown in an upper part in FIG. 6 represents one printed reference image. In Step S120, one printed reference image is divided into n-number (n is an integer larger than or equal to two) of printed partial images arranged along the first direction Dy. The reference image data Bj representing one printed reference image is divided into n-number pieces of partial data SA(1) to SA(n) representing the n-number of printed partial images. Average luminance values Ya(1) to Ya(n) are calculated for the pieces of partial data SA(1) to SA(n), respectively. The average luminance values Ya(1) to Ya(n) are calculated for every printed reference image.

Graphs shown in a lower part in FIG. 6 indicate positional dependency of an average luminance value Ya. Position Py in the first direction Dy is represented as the horizontal axis and the average luminance value Ya is represented as the vertical axis. The position Py is a position in the first direction Dy of a partial image represented by partial data SA used in the calculation of the average luminance value Ya. Ten graphs corresponding to the ten printed reference images B1 to B10 are shown in the lower part in FIG. 6. Reference numerals B1 to B10 that are the same as those of the corresponding printed reference images are added to the respective graphs. Positions Pyb1 to Pyb7 of the high support 265b (FIG. 2) and positions Pya1 to Pya6 of the pressure applying portion 269 are shown on the horizontal axis. As shown in the lower part in FIG. 6, the average luminance value Ya of each of the printed reference images B1 to B10 is varied in a corrugated pattern depending on the position Py in the first direction Dy. Specifically, the average luminance value Ya is relatively large (i.e. bright) at the positions Pya1 to Pya6 of the pressure applying portion 269 and the average luminance value Ya is relatively small (i.e. dark) at the positions Pyb1 to Pyb7 of the high support 265b. In other words, the density is relatively low (i.e. light) at the positions Pya1 to Pya6 of the pressure applying portion 269 and the density is relatively high (i.e. deep) at the positions Pyb1 to Pyb7 of the high support 265b.

In the present embodiment, the luminance value is corrected in order to suppress such unevenness in brightness (or density) of the printed image. Specifically, the luminance value is changed to relatively low at the positions Pya1 to Pya6 of the pressure applying portion 269 and the luminance value is changed to relatively high at the positions Pyb1 to Pyb17 of the high support 265b.

FIG. 7 is a graph indicating the first correction data 134a (which may also be referred to as "amplitude coefficient data 134a). Amplitude coefficient Amc is represented as the vertical axis and the position Py in the first direction Dy is represented as the horizontal axis. The amplitude coefficient Amc represents the magnitude of the amount of correction in the correction of the luminance value. Note that the amount of correction is increased (i.e. the luminance value is decreased) with the increasing amplitude coefficient Amc. In the present embodiment, the amplitude coefficient Amc is set to "1" at the positions Pya1 to Pya6 of the pressure applying portion 269, and is set to "0" at the positions Pyb1 to Pyb7 of the high support 265b. In other words, the amplitude coefficient Amc is equal to "0" at the position Py whose gap coincides with the gap of the reference plane 300s (the reference gap GPs) in FIG. 3B. The amplitude coefficient Amc is determined by linear interpolation at the other positions Py. The amplitude coefficient data 134a is table data representing the amplitude coefficient Amc at each of the positions Pya1 to Pya6 and the positions Pyb1 to Pyb7.

The amplitude coefficients Amc at the other positions Py need not be determined by the liner interpolation, and may instead be determined by various other interpolation methods (for example, interpolation using a spline function or a sine function) or may be determined in accordance with the actual shape of the deformed sheet. In general, data that defines the dependency of the amount of correction on the print position, such that the amount of correction when the print position in the first direction Dy is within the first-type areas A1 is different from the amount of correction when the print position in the first direction Dy is within the second-type areas A2, is available as the amplitude coefficient data 134a. The amplitude coefficient data 134a preferably defines the amount of correction such that the density in the first-type areas A1 is changed to relatively higher than that in the second-type areas A2. The amplitude coefficient data 134a may be data in another arbitrary format, which defines the relationship between the amplitude coefficient Amc and the position Py (for example, a lookup). Note that the amplitude coefficient data 134a is determined in advance independently of the printed test image 400.

FIG. 6 shows amplitudes Am1 to Am10 of the respective graphs (B1 to B10). The amplitudes Am1 to Am10 each indicate the difference between the maximum value and the minimum value after smoothing using moving average is performed. The smoothing need not be performed by the method using the moving average and may be performed by any other desired smoothing method. The amplitudes Am1 to Am10 calculated in the above manner represent the difference between the densities (luminance values) in multiple printed partial reference images in the multiple first-type areas A1 and the densities (luminance values) in multiple printed partial reference images in the multiple second-type areas A2. The difference in density need not be calculated in the above manner and may be calculated by various other methods. For example, the difference between the average luminance value of the partial reference images in the first-type areas A1 and the average luminance value of the partial reference images in the second-type areas A2 may be adopted as the difference in density (i.e. the amplitudes Am1 to Am10).

As shown in FIG. 6, the amplitudes Am1 to Am10 are varied depending on the luminance values YB1 to YB10 of the original reference images B1i to B10i. Specifically, the bright reference image (e.g. the tenth reference image B10i) and the dark reference image (e.g. the first reference image B1i) have smaller amplitudes and the reference images having intermediate brightness have larger amplitudes. In the present embodiment, the amount of correction is varied with the luminance value Y in order to suppress the unevenness in density varied with the brightness (density) of the image.

FIG. 8 is a graph representing the second correction data 134b (which may also be referred to as "amplitude data 134b"). Amplitude Am is represented as the vertical axis and the luminance value Y is represented as the horizontal axis. The amplitude Am represents the magnitude of the amount of correction in the correction of the luminance value. Note that the amount of correction is increased (i.e. the luminance value is decreased) with the increasing amplitude Am. In the present embodiment, the amplitudes Am at the ten luminance values YB1 to YB10 of the test image data 400d (FIG. 5A) are set to the ten amplitudes Am1 to Am10 calculated from the scanned data, respectively. The amplitudes Am are determined by the linear interpolation at the other luminance values Y. As described above, the amplitude data 134b is data that defines the dependency of the amount of correction on the luminance value (the density) such that the respective amounts of correction associated with the respective luminance values YB1 to YB10 (the densities) of the respective reference images B1i to B10i are increased with the increasing corresponding respective amplitudes Am1 to Am10 (the difference in density) calculated from the respective printed reference images B1 to B10. For example, the amount of correction associated with the luminance value YB5 of the fifth reference image B5i is increased with the increasing amplitude Am5 calculated from the printed reference image B5. The amplitude data 134b is table data indicating the amplitude Am of each of the luminance values YB1 to YB10. The amplitudes Am of the other luminance values Y need not be determined by the linear interpolation and may be determined by various other interpolation methods (for example, the interpolation method using the spline function). The amplitude data 134b may be data in another arbitrary format, which defines the relationship between the amplitude Am and the luminance value Y (for example, a lookup table).

Referring back to FIG. 4, in Step S130, the correction integrated data 134 (e.g. the amplitude coefficient data 134a and the amplitude data 134b) is generated. The amplitude coefficient data 134a is determined in advance independently of the printed test image 400, as described above with reference to FIG. 7. The amplitude data 134b is determined in accordance with the result of the analysis of the scanned data about the printed test image 400, as described above with reference to FIG. 8. The generated correction integrated data 134 is stored in the non-volatile memory 130 in the printing apparatus 600 (FIG. 1).

The printing using the correction integrated data 134 will now be described. FIG. 9 is a flow chart showing a printing process performed by the printing apparatus 600 (FIG. 1). The printer driver M100 starts the printing in response to an instruction from a user (for example, an operation by the user with the operation unit 170 or a command transmitted from a computer (not shown) connected to the communication unit 190). The printer driver M100 acquires target image data to be printed from an external apparatus connected to the communication unit 190.

In Step S200, the corrected data generation unit M104 (FIG. 1) converts the target image data into bitmap data (rasterization). The pixel data included in the bitmap data is, for example, RGB pixel data representing the color of the pixel with tone values (for example, 256-tones from 0 to 255) of three color components: red (R), green (G), and blue (B). Note that the density of pixels of the bitmap data corresponds to the print resolution (the maximum density of dots).

In Step ScA subsequent to Step S200, the corrected data generation unit M104 (FIG. 1) performs image correction Sc. In the present embodiment, the corrected data generation unit M104 corrects the luminance value of the bitmap data in the image correction Sc using the correction integrated data 134 described above. The image correction Sc will be described in detail below. The image correction Sc may be performed in Step ScB or Step S220, instead of Step ScA. The configuration in which the image correction Sc is performed in Step ScB will be described in a second and forth embodiments and the configuration in which the image correction Sc is performed in Step S220 will be described in a third embodiment. Image data to be subjected to the image correction Sc may also be referred to as "input image data."

In Step S210, the corrected data generation unit M104 (FIG. 1) converts the RGB pixel data included in the corrected bitmap data into CMYK pixel data (color conversion). The CMYK pixel data represents the color of the pixel with tone values of four color components: cyan, magenta, yellow, and black. The number of tones is larger than the total number of dot formation states (e.g. four values in the present embodiment), and is, for example, 256-tones from 0 to 255. The color conversion is performed by using a lookup table in which the RGB pixel data is associated with the YMCK pixel data.

In Step S220, the corrected data generation unit M104 (FIG. 1) converts the bitmap data including the CMYK pixel data into dot data representing the dot formation state of each pixel (halftoning). In the present embodiment, the corrected data generation unit M104 generates the dot data in accordance with error diffusion method using the matrix 136. However, the dot formation state need not be determined by the error diffusion method and may be determined by other arbitrary methods (for example, a method using a dither matrix). Various numbers (e.g. two tones or four tones) which are smaller than the number of tones in the CMYK pixel data (e.g. 256 tones in the present embodiment) and which are larger than or equal to two may be adopted as the total number of the dot formation states.

In Step S230, the corrected data generation unit M104 (FIG. 1) generates print data from the dot data. The print data is represented in a data format interpretable by the print execution unit 200. In the present embodiment, the corrected data generation unit M104 generates the print data such that the bidirectional printing is performed.

In Step S240, the corrected data supply unit M106 supplies the print data to the print execution unit 200. The print execution unit 200 prints an image in accordance with the received print data.

The image correction Sc will now be described. In Step Sc1, the correction data acquisition unit M102 (FIG. 1) acquires the correction integrated data 134 (e.g. the amplitude coefficient data 134a and the amplitude data 134b) from the non-volatile memory 130. In Step Sc2, the corrected data generation unit M104 performs the correction by using the correction integrated data 134. Step Sc1 may be performed at arbitrary timing before the correction process Sc2.

Figure 10:
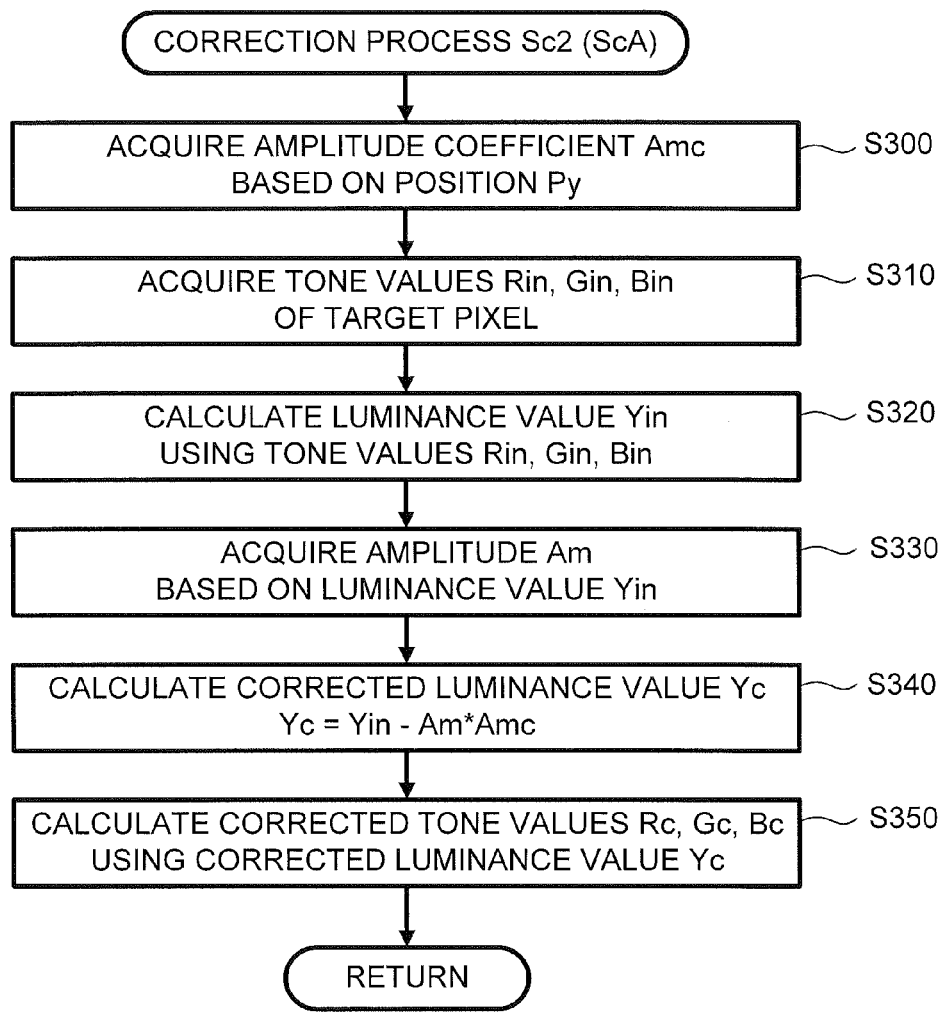
FIG. 10 is a flow chart showing a correction process Sc2.

FIG. 10 is a flow chart showing the correction process Sc2. The correction process Sc2 is performed for each pixel. In Step S300, the corrected data generation unit M104 (FIG. 1) refers to the amplitude coefficient data 134a to acquire an amplitude coefficient Amc associated with a position Py in the first direction Dy of a pixel to be processed (which may also be referred to as a "target pixel") (see FIG. 7).

In Step S310, the corrected data generation unit M104 acquires tone values Rin, Gin, and Bin of the target pixel.

In Step S320, the corrected data generation unit M104 uses the tone values Rin, Gin, and Bin of the target pixel to calculate a luminance value Yin. In the present embodiment, the following conversion equation is used to convert the tone values Rin, Gin, and Bin into the luminance value Yin:

$$Yin=0.29891*Rin+0.58661*Gin+0.11448*Bin$$ (* hereinafter denotes a multiplication symbol)

In Step S330, the corrected data generation unit M104 refers to the amplitude data 134b to acquire amplitude Am associated with the luminance value Yin (see FIG. 8).

In Step S340, the corrected data generation unit M104 uses the luminance value Yin, the amplitude coefficient Amc, and the amplitude Am to calculate a corrected luminance value Yc. The corrected luminance value Yc is calculated according to the following equation in the present embodiment:

$$Yc=Yin-Am*Amc$$

The above equation indicates that the corrected luminance value Yc is decreased with the increasing amplitude Am and that the corrected luminance value Yc is decreased with the increasing amplitude coefficient Amc.

In Step S350, the corrected data generation unit M104 uses the corrected luminance value Yc to calculate corrected tone values Rc, Gc, and Bc. In the present embodiment, the corrected tone values Rc, Gc, and Bc are calculated according to the following conversion equation between an RGB color space and a YCbCr color space:

$$Rc=Yc+1.40200*Cr$$

$$Gc=Yc-0.34414*Cb-0.71414*Cr$$

$$Bc=Yc+1.77200*Cb$$

where Cr and Cb are calculated according to the following equations:

$$Cb=-0.16874*Rin-0.33126*Gin+0.5*Bin$$

$$Cr=0.5*Rin-0.41869*Gin-0.08131*Bin$$

The tone values of each pixel are corrected in the above manner.

Figure 11A:
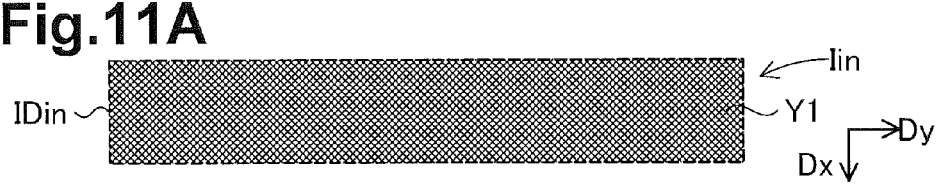
FIGS. 11A through 11E are schematic diagrams showing examples of how luminance (density) is varied in the printing process.
Figure 11B:
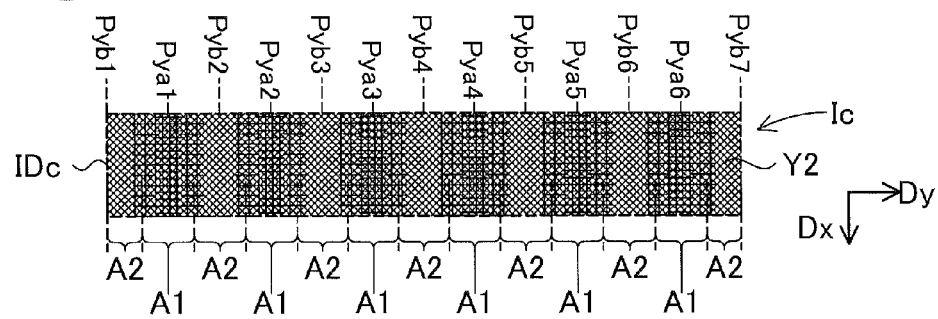
Figure 11C:
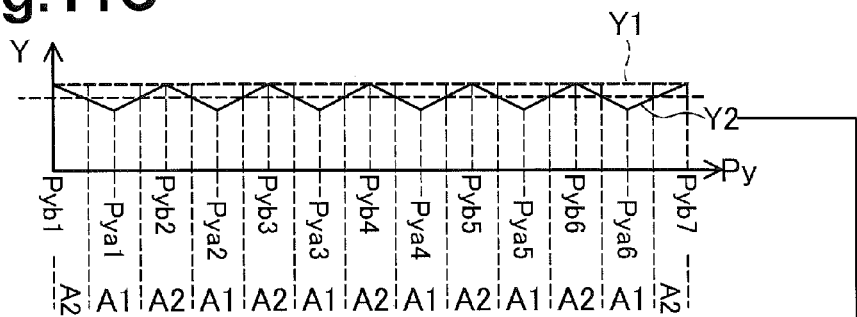

FIGS. 11A to 11E are schematic diagrams showing examples of how the luminance (density) is varied in the printing process. FIG. 11A shows input image data IDin (bitmap data before the correction in the image correction Sc). The input image data IDin represents a gray image having constant tone values (which may also be referred to as an "input image Iin"). FIG. 11C is a graph showing the relationship between the position Py in the first direction Dy and the luminance value Y. An input luminance value Y1 is a luminance value represented by the input image data IDin. The input luminance value Y1 is constant, which is not dependent on the position Py.

FIG. 11B shows corrected bitmap data IDc generated by performing the image correction Sc for the input image data IDin. The areas A1 and A2 and the directions Dx and Dy are indicated based on the printed image when the corrected bitmap data IDc is printed. The corrected bitmap data IDc represents an image in which the density of the first-type areas A1 is higher than that of the second-type areas A2 (which may be referred to as a "corrected image Ic"). A corrected luminance value Y2 in FIG. 11C is a luminance value represented by the corrected bitmap data IDc. The corrected luminance values Y2 in areas (i.e. the first-type areas A1) near the positions Pya1 to Pya6 of the pressure applying portions 269 are lower than the corrected luminance values Y2 in areas (i.e. the second-type areas A2) near the positions Pyb1 to Pyb7 of the high supports 265b. Supposing that the corrected bitmap data IDc is printed on a flat sheet (for example, the reference sheet 300f in FIG. 3B), the luminance value of the printed image is varied in the same manner as in the corrected luminance value Y2 (for example, in a case in which the printing is performed with the pressure applying portion 269 being removed).

Figure 11D:
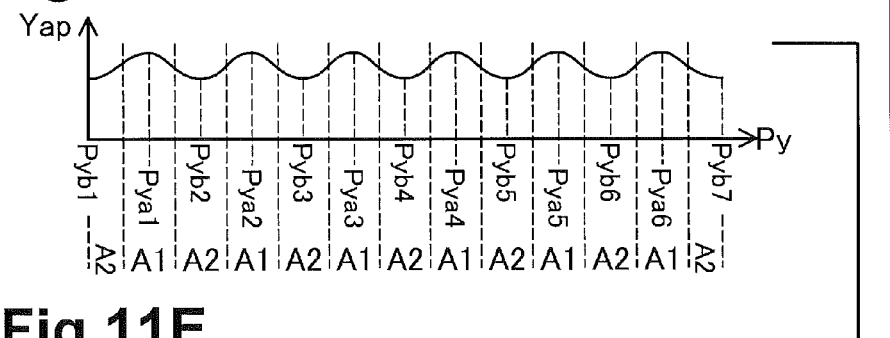

FIG. 11D is a graph showing the relationship between the position Py in the first direction Dy and a hypothetical luminance value Yap. The hypothetical luminance value Yap indicates luminance value of a printed input image printed on a sheet deformed into the corrugated shape by using the input image data IDin without the image correction Sc. The hypothetical luminance value Yap is calculated in the same manner as in the average luminance value Ya in FIG. 6. The hypothetical luminance value Yap varies in a corrugated pattern depending on the position Py, as in the graphs in FIG. 6.

Figure 11E:
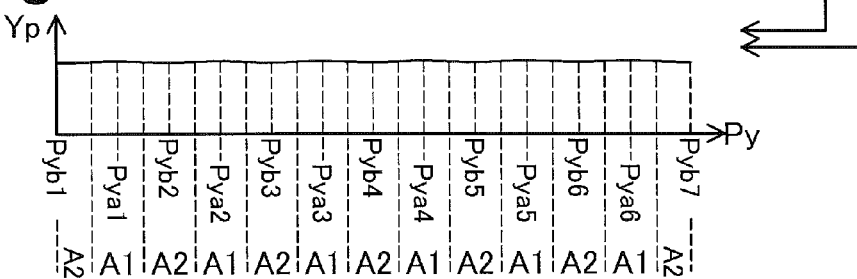

FIG. 11E is a graph showing the relationship between the position Py in the first direction Dy and a printed luminance value Yp. The printed luminance value Yp indicates the luminance value of a printed image resulting from printing the corrected bitmap data IDc on a sheet deformed into the corrugated shape. The printed luminance value Yp is acquired by the same method as in the average luminance value Ya in FIG. 6. The printed luminance value Yp results from integration of the variation in luminance (density) caused by the deformation of the sheet into the corrugated shape (the variation similar to that of the hypothetical luminance value Yap in FIG. 11D) with the variation in luminance caused by the image correction Sc (the variation similar to that of the corrected luminance value Y2 in FIG. 11C). The variation pattern of the corrected luminance value Y2 is substantially equal to the pattern in which the peaks and the troughs in the variation pattern of the hypothetical luminance value Yap is reversed. Accordingly, the variation of the printed luminance value Yp depending on the position Py is smaller than the variation when the input image data IDin is printed without correction (refer to FIG. 11D).

Although the printing of the gray image is described above, the tone values are corrected in accordance with the correction process in FIG. 10 also when images representing various other colors are printed. Also when images of chromatic colors different from gray (more generally, achromatic colors) are printed, the positional shift of the dots occurs, as described above with reference to FIG. 3B. That is, also when images of the chromatic colors are printed, the density (brightness) is varied depending on the position in the first direction Dy (i.e. the unevenness in density occurs), as in the case in which images of the achromatic colors are printed. Although the colors of chromatic images are different from the colors of achromatic images, the feature in which the density represented by the pattern of the dots is increased with the decreasing luminance value Y is common to the chromatic images and the achromatic images. Accordingly, also when the chromatic images are printed, the correction process Sc2 can be performed to suppress the unevenness in density, as in the case in which the achromatic images are printed.

As described above, in the first embodiment, as shown in FIG. 11C, if the input image data IDin (FIG. 11A) represents an image having constant tone values and the sheet is conveyed in a flat state without deformation during the printing (for example, the printing is performed on the reference sheet 300f in FIG. 3B), the input data is corrected such that the luminance value (density) of the printed image varies depending on the position Py in the first direction Dy, like the corrected luminance value Y2. In this case, the printed image is an image similar to the corrected image Ic shown in FIG. 11B. Specifically, the density of the printed partial images in the first-type areas A1 is higher than that of the printed partial images in the second-type areas A2. Note that the multiple first-type areas A1 and the multiple second-type areas A2 extend along the conveying direction Dx and are alternately arranged along the first direction Dy. As described above, in the correction process Sc2 in FIG. 10, the tone values are corrected so that the luminance (density) of the partial images printed in the first-type areas A1 is different from the luminance (density) of the partial images printed in the second-type areas A2, more specifically, so that the luminance (density) of the partial images printed in the first-type areas A1 is lower (higher) than the luminance (density) of the partial images printed in the second-type areas A2, as shown by the corrected luminance value Y2. Accordingly, it is possible to reduce the unevenness in density of the printed image caused by the deformation of the sheet into the corrugated shape.

A specific range GR is hatched in FIG. 3B. The specific range GR is a range in which the gap between the nozzle plane np and the sheet is smaller than the gap threshold value GPth. As shown in FIG. 3B, the first-type areas A1 are areas in which the gap between the sheet 300 and the nozzles 250n (the nozzle plane np) is outside the specific range GR, and the second-type areas A2 are areas in which the gap between the sheet 300 and the nozzles 250n (the nozzle plane np) is within the specific range GR. Since the density (the luminance value) in the first-type area A1 is made different from that in the second-type areas A2 in the correction process Sc2, like the corrected luminance value Y2 in FIG. 11C, it is possible to reduce the unevenness in density of the printed image caused by the fact that the gap in part of the areas (the first-type areas A1) is outside the specific range GR. In particular, since the specific range GR, within which the range of the gap of the second-type areas A2 exists, is a range smaller that the gap threshold value GPth, it is possible to reduce the unevenness in density between the first-type area A1 having the relatively large gap and the second-type areas A2 having the relatively small gap. Like the corrected luminance value Y2 in FIG. 11C, the tone values are corrected in the correction process Sc2 such that the density in the first-type areas A1 is higher than that in the second-type areas A2. Accordingly, when the density of the printed partial images in the first-type areas A1 is lower than the density of the printed partial images in the second-type areas A2, which is caused by the deformation of the sheet 300 into the corrugated shape, the density of the printed partial images in the first-type areas A1 is made close to the density of the printed partial images in the second-type areas A2, thereby suppressing the unevenness in density.

In addition, in the first embodiment, the image data (the input image data) to be subjected to the correction process Sc2 (FIG. 10) is image data (bitmap data) in which the colors are represented with the tone values of the RGB color components. The corrected data generation unit M104 (FIG. 1) refers to the correction integrated data 134 to identify the amount of correction (e.g. the amplitude Am*the amplitude coefficient Amc) by using the luminance value Yin associated with the RGB tone values Rin, Gin, and Bin of the target pixel in the input image data and the position Py of the target pixel in the first direction Dy (the print position). The corrected data generation unit M104 calculates the corrected RGB tone values Rc, Gc, and Bc using the identified amount of correction (FIG. 10). The corrected data generation unit M104 generates the corrected print data in accordance with the corrected RGB tone values Rc, Gc, and Bc (see Steps S210 to S230 in FIG. 9). Since the amount of correction is varied with the print position of the target pixel in the first direction Dy, as described above, it is possible to suppress the unevenness in density caused by the deformation of the sheet 300 into the corrugated shape along the first direction Dy. Furthermore, since the amount of correction is varied with the RGB tone values Rin, Gin, and Bin of the target pixel (more specifically, the luminance value Yin (corresponding to the density associated with the RGB tone values Rin, Gin, and Bin)), it is possible to appropriately suppress the unevenness in density even if the feature of the unevenness in density is varied with the RGB tone values. In particular, the correction is performed to the luminance value represented by the RGB tone values in the present embodiment. As a result, it is possible to appropriately correct the density of the printed image.

Furthermore, in the first embodiment, as shown in FIG. 2B and FIG. 3B, the sheet conveying unit 260 includes the multiple high supports 265b supporting the sheet 300 from its lower face. The multiple high supports 265b are arranged along the first direction Dy at positions opposing the print head 250 that moves in parallel to the first direction Dy. The sheet conveying unit 260 includes the multiple pressure applying portions 269, which apply the power on the sheet 300 downward from its upper face (more specifically, downward under the positions where the high supports 265b are in contact with the sheet 300 (the reference height SH)). The position of each of the pressure applying portions 269 in the first direction Dy is arranged between two adjacent high supports 265b. Accordingly, the sheet conveying unit 260 is capable of appropriately deforming the sheet 300 into the corrugated shape. In particular, in the present embodiment, the positions of the multiple pressure applying portions 269 in the first direction Dy are alternately aligned with the positions of the multiple high supports 265b in the first direction Dy. Accordingly, the sheet 300 is deformed into the corrugated shape in which the peaks and the troughs are repeated, so that it is possible to reduce the probability of the sheet 300 being subjected to the unintentional deformation, as shown by reference numeral 302 in FIG. 2C.

B. Second Embodiment

Figure 12:
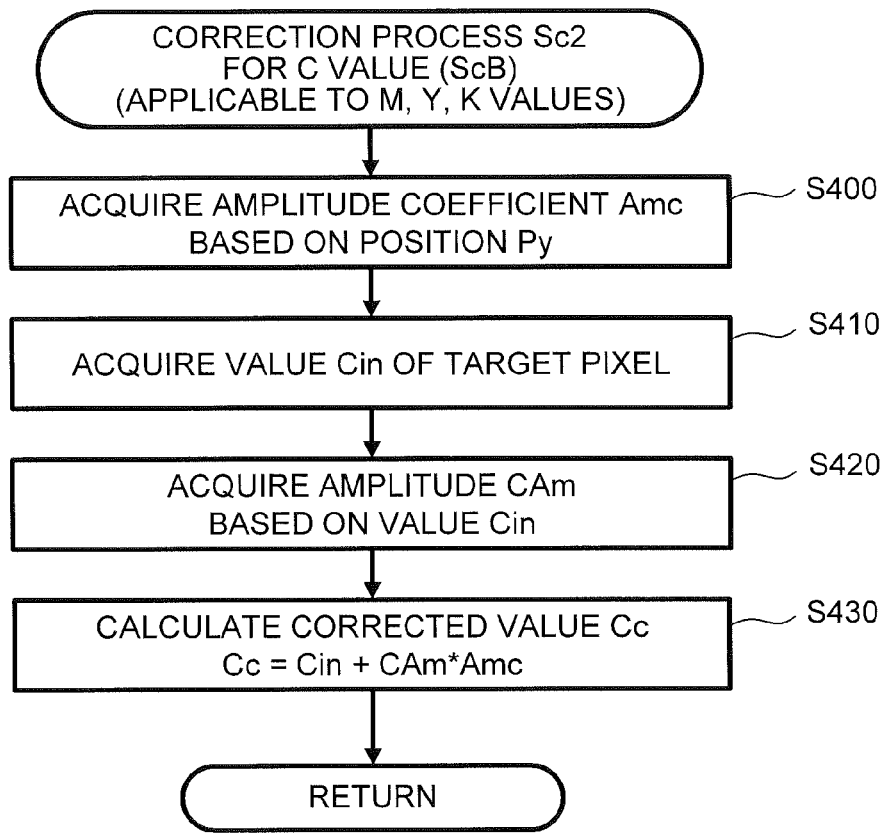
FIG. 12 is a flow chart showing a correction process Sc2 in a second embodiment.

FIG. 12 is a flow chart showing the correction process Sc2 in a second embodiment. In the second embodiment, the image correction Sc (see FIG. 9) is performed in Step ScB, instead of Step ScA, unlike the first embodiment. The image data to be subjected to the correction process Sc2 (i.e. the input image data) is image data after the color conversion of Step S210 (i.e. bitmap data representing the colors with the tone values of the CMYK color components). In the second embodiment, the correction process Sc2 is performed for every CMYK color component and for every print pixel. In addition, instead of the amplitude data 134b in the first embodiment (see FIG. 1 and FIG. 8), amplitude data prepared for every CMYK color component is used. The amplitude coefficient data 134a is the same as that in the first embodiment. The correction data acquisition unit M102 acquires the amplitude coefficient data 134a and the amplitude data for every CMYK color component in Step Sc1 in the image correction Sc. The content of the process excluding the image correction Sc, and the configuration of the printing apparatus 600 are the same as those in the first embodiment.

A process for the cyan C component is exemplified here. In Step S400 of FIG. 12, the corrected data generation unit M104 (FIG. 1) refers to the amplitude coefficient data 134a to acquire the amplitude coefficient Amc (see FIG. 7) associated with the position Py of a pixel to be processed (target pixel) in the first direction Dy.

In Step S410, the corrected data generation unit M104 acquires a cyan tone value Cin of the target pixel.

In Step S420, the corrected data generation unit M104 refers to the amplitude data for cyan (which may also be referred to as "cyan amplitude data 134bC") to acquire an amplitude CAm associated with the cyan tone value Cin. The cyan amplitude data 134bC is determined by using the test image, like the amplitude data 134b in the first embodiment. The cyan amplitude data 134bC is determined in the same manner as in the first embodiment in FIG. 4.

Figure 13A:
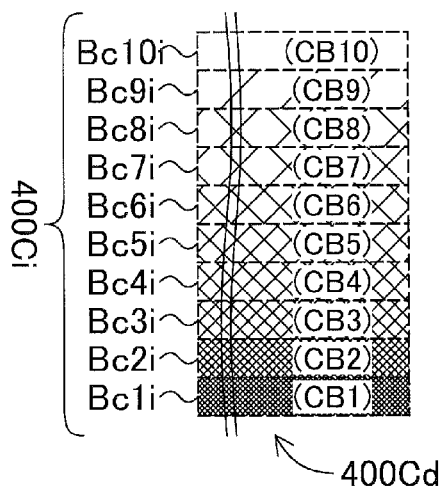
FIGS. 13A through 13C are diagrams for describing a test image in the second embodiment.

FIG. 13A is a diagram for describing test image data 400Cd used in the determination of the cyan amplitude data 134bC. In the second embodiment, the test image data 400Cd represents the respective colors of multiple pixels with the tone values of the CMYK color components. A test image 400Ci represented by the test image data 400Cd includes reference images Bc1i to Bc10i having the same shapes as those of the reference images B1i to B10i in FIG. 5A. The reference images Bc1i to Bc10i for cyan compose uniform cyan areas having different cyan densities (cyan tone values). Note that the tone values of the color components other than cyan are equal to zero. Cyan tone values CB1 to CB10 shown in FIG. 13A indicate the cyan tone values of the reference images Bc1i to Bc10i, respectively. The cyan tone values CB1 to CB10 are arranged in the descending order of the density (in the descending order of the darkness).

Figure 13B:
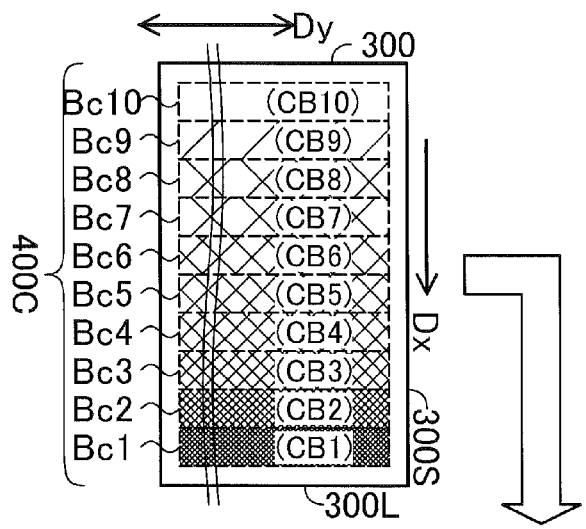

FIG. 13B is a diagram for describing a printed test image 400C. The printing apparatus 600 (FIG. 1) uses the test image data 400Cd to print the test image 400Ci on the sheet 300 without the density correction. The printed test image 400C includes printed reference images Bc1 to Bc10 having the shapes similar to those of the printed reference images B1 to B10 in FIG. 5B. The printed reference images Bc1 to Bc10 correspond to the reference images Bc1i to Bc10i in FIG. 13A, respectively. The printed reference images Bc1 to Bc10 include the multiple first-type areas A1 and the multiple second-type areas A2, like the printed reference images B1 to B10 in FIG. 5B, although not shown in FIG. 13B. The printed image in the first-type areas A1 is brighter than that in the second-type areas A2 (the cyan density is low in the first-type areas A1 in appearance).

Figure 13C:
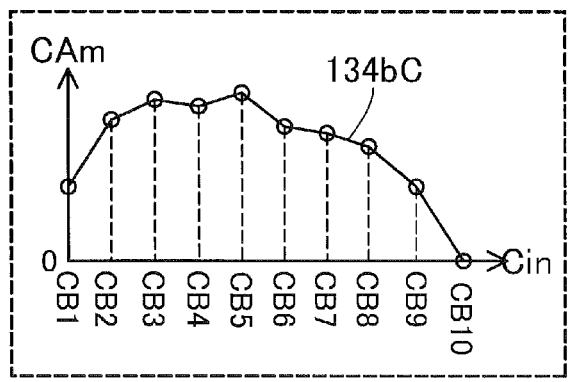

The printed test image 400C is used to determine the amplitude CAm for each of the cyan tone values CB1 to CB10 in accordance with the same method as the one described above with reference to FIG. 6. The amplitude CAm is calculated by using the tone values (for example, the RGB tone values) of the scanned data of the printed test image 400C. Specifically, the amplitude CAm is determined in accordance with the variation in the tone value of the cyan component calculated by using the RGB tone values. FIG. 13C is a graph showing the relationship between the cyan tone value Cin and the amplitude CAm (that is, the cyan amplitude data 134bC). The amplitudes CAm of the cyan tone values CB1 to CB10 are determined to be the values calculated from the scanned data. The amplitudes CAm of the other cyan tone values are determined by the interpolation.

In Step S430 of FIG. 12, the corrected data generation unit M104 calculates a corrected tone value Cc by using the cyan tone value Cin, the amplitude coefficient Amc, and the amplitude CAm. In the present embodiment, the corrected tone value Cc is calculated according to the following equation:

$$Cc = Cin + CAm*Amc$$

As apparent from this equation, the corrected tone value Cc is increased with the increasing amplitude coefficient Amc. Since the amplitude coefficient Amc in the first-type areas A1 is larger than that in the second-type areas A2, the cyan density of the printed image can be increased in the first-type areas A1, compared with the second-type areas A2. As a result, it is possible to reduce the difference in the cyan density between the first-type areas A1 and the second-type areas A2. In general, since the amount of correction (CAm*Amc) is varied with the print position in the first direction Dy, it is possible to suppress the unevenness in density caused by the deformation of the sheet 300 into the corrugated shape along the first direction Dy. In addition, the corrected tone value Cc is increased with the increasing amplitude CAm. The amplitude CAm is varied with the cyan tone value Cin. That is, the amount of correction is varied with the cyan tone value Cin. Accordingly, it is possible to appropriately suppress the unevenness in density even if the feature of the unevenness in density is varied with the cyan tone value Cin.

Also as for the color components (magenta, yellow, and black) other than cyan, the test images using the respective colors of ink are used to determine the amplitude data. The corrected data generation unit M104 determines the corrected tone values of the other color components in the same manner as in the calculation of the corrected tone value Cc based on the cyan tone value Cin. Then, the corrected data generation unit M104 determines the dot formation state in accordance with the corrected tone value of the color of the ink (see Step S220 in FIG. 9).

As described above, in the second embodiment, the corrected data generation unit M104 corrects the tone values of the CMYK color components (which may also be referred to as "ink color tone values") in the input image data so as to generate the corrected print data in accordance with the corrected ink color tone values. Accordingly, it is possible to appropriately correct the density of the printed image. In addition, in the second embodiment, the corrected data generation unit M104 refers to the amplitude coefficient data 134a and the amplitude data for every CMYK color to identify the amount of correction (e.g. the amplitude CAm*the amplitude coefficient Amc) by using the ink color tone values (for example, the cyan tone value Cin) of the target pixel in the input image data and the position Py (the print position) of the target pixel in the first direction Dy. The corrected data generation unit M104 calculates the corrected ink color tone values (e.g. the corrected tone value Cc) in accordance with the identified amount of correction (see FIG. 12) so as to generate the corrected print data in accordance with the corrected ink color tone values (see Step S220 to S230 in FIG. 9). Since the amount of correction is varied with the print position of the target pixel in the first direction Dy as described above, it is possible to suppress the unevenness in density caused by the deformation of the sheet 300 into the corrugated shape along the first direction Dy. Furthermore, since the amount of correction is varied with the ink color tone values of the target pixel (for example, the amount of correction of cyan is varied with the cyan tone value Cin), it is possible to appropriately suppress the unevenness in density even if the feature of the unevenness in density is varied with the ink color tone values.

In addition, the configuration excluding the image data to be processed in the image correction Sc and excluding the content of the image correction Sc is the same as that in the first embodiment. Accordingly, the second embodiment has various advantages similar to those in the first embodiment.

C. Third Embodiment

Figure 15:
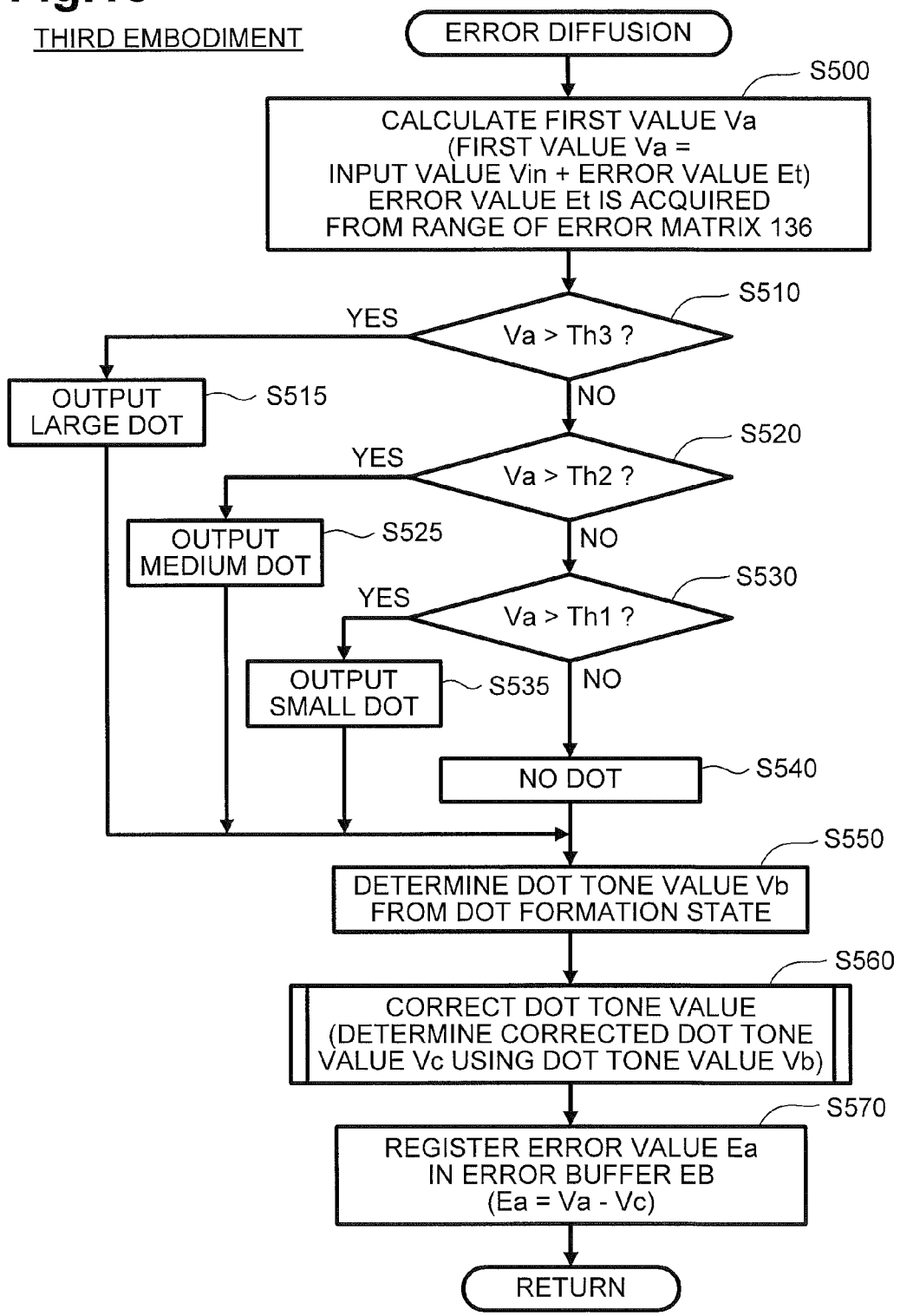
FIG. 15 is a flow chart showing the halftoning process.

FIG. 14 schematically shows the halftoning process in a third embodiment. FIG. 15 is a flow chart showing the halftoning process. In the third embodiment, the image correction Sc (see FIG. 9) is incorporated in the halftoning (Step S220). In other words, the halftoning corresponds to the image correction Sc. The image data to be subjected to the image correction Sc is image data after the color conversion (Step S210) (i.e. bitmap data in which the colors are represented by using the tone values of the CMYK color components), as in the second embodiment. However, in the third embodiment, the corrected CMYK tone values are not determined and the dot formation states are determined through the correction process Sc2 (i.e. the halftoning). The amplitude data for correction is the same as that in the second embodiment described above with reference to FIG. 13C (is prepared for every CMYK color component). The amplitude coefficient data 134a is the same as that in FIG. 7 of the first embodiment. The content of the process excluding the image correction Sc (Step S220) and the configuration of the printing apparatus 600 are the same as those in the first embodiment.

The halftoning process in FIG. 15 is performed for every color of ink and for every pixel. This process determines the dot formation state for every pixel. In the present embodiment, the dot formation state is determined from the following four states having different amounts of ink (that is, having different dot sizes (having different densities represented by the dots)):

A) Large dot
   B) Medium dot (the density of the medium dot<the density of the large dot)
   C) Small dot (the density of the small dot<the density of the medium dot)
   D) No dot In Step S500 of FIG. 15, the corrected data generation unit M104 (FIG. 1) uses the matrix 136 (FIG. 1) and an error buffer EB (FIG. 14) to calculate an error value Et of a pixel to be processed (a target pixel). As described below, the error buffer EB stores a density error (the error value in tone) in each pixel. The error buffer EB is provided in the volatile memory 120 (FIG. 1). The matrix 136 adds a weight larger than zero to each pixel arranged in a certain relative position around the target pixel. In the matrix 136 of FIG. 14, a symbol "+" represents the target pixel and weights a-m are assigned to surrounding pixels. The sum of the weights a-m is equal to one. The corrected data generation unit M104 calculates a weighted sum of the error values of the surrounding pixels as the error value Et for the target pixel in accordance with the weights. Then, the corrected data generation unit M104 calculates the sum of the error value Et and the tone value of the target pixel (which may also be referred to as an input tone value Vin) (for example, the tone value of cyan) as a first tone value Va. The matrix 136 of FIG. 14 is used when a process of determining the dot state advances in the −Dy direction. When the process of determining the dot state advances in the +Dy direction, a matrix in which the relative positions in the first direction Dy are inverted with respect to the target pixel is used.

In Step S510 to Step S540, the corrected data generation unit M104 determines the dot formation state of the target pixel on the basis of the relationship in magnitude between the first tone value Va and three threshold values Th1 to Th3. In the present embodiment, the input tone value Vin is represented in 256 tones from zero to 255. The first threshold value Th1 is a threshold value for outputting the small dot (e.g. zero). The second threshold value Th2 is a threshold value for outputting the medium dot (e.g. 84). The third threshold value Th3 is a threshold value for outputting the large dot (e.g. 170).

The corrected data generation unit M104 determines the dot formation states in the following manner:

A) The first tone value Va>the third threshold value Th3 (YES in Step S510): the dot formation state="Large dot" (see Step S515).
   B) The first tone value Va is lower than or equal to the third threshold value Th3 and the first tone value Va>the second threshold value Th2 (YES in Step S520): the dot formation state="Medium dot" (see Step S525)
   C) The first tone value Va is lower than or equal to the second threshold value Th2 and the first tone value Va>the first threshold value Th1 (YES in Step S530): the dot formation state="Small dot" (see Step S535)
   D) The first tone value Va is lower than or equal to the first threshold value Th1 (NO in Step S530): the dot formation state="No dot" (see Step S540)

In Step S550 after the dot formation state is determined, the corrected data generation unit M104 acquires the tone value (referred to as a "dot tone value Vb") associated with the determined dot formation state. In the present embodiment, the dot tone value Vb is set in the following manner:

A) Large dot: the dot tone value Vb=255
B) Medium dot: the dot tone value Vb=170
C) Small dot: the dot tone value Vb=84
D) No dot: the dot tone value Vb=zero The dot tone value Vb represents the tone value (density) represented by the dot formation state. Such correspondence is incorporated in the corrected data generation unit M104 in advance as a dot tone value table.

In Step S560, the corrected data generation unit M104 determines a corrected dot tone value Vc from the dot tone value Vb. The corrected dot tone value Vc is determined by using the correction integrated data 134 described above. The determination of the corrected dot tone value Vc will be described in detail below.

In Step S570, the corrected data generation unit M104 calculates a target error value Ea. The target error value Ea is represented according to the following equation:

(Target error value Ea)=(First tone value Va)−(Corrected dot tone value Vc)

The corrected data generation unit M104 registers the calculated target error value Ea in the error buffer EB as the error value of the target pixel.

Figure 16:
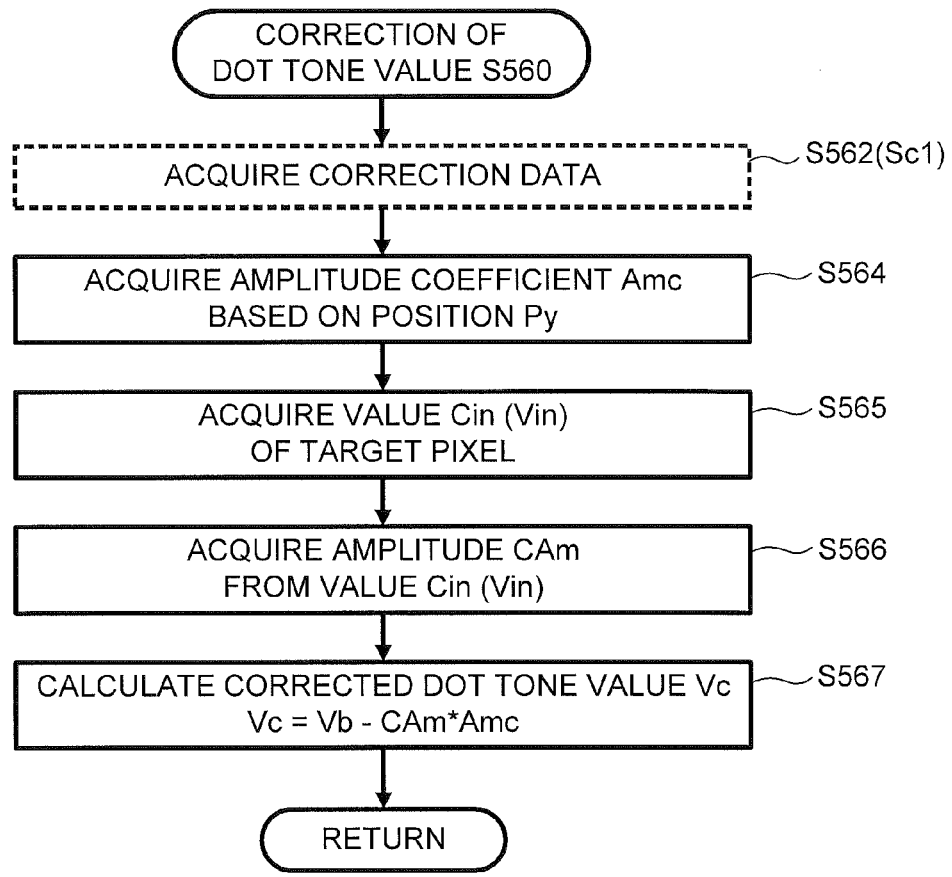
FIG. 16 is a flow chart of step S560 of the halftoning process.

FIG. 16 is a flow chart showing Step S560 in detail. The processing of the cyan C component will now be exemplified. In Step S562, the correction data acquisition unit M102 (FIG. 1) acquires the correction integrated data 134 (e.g. the amplitude coefficient data 134a and the amplitude data for every CMYK color component) from the non-volatile memory 130. The correction data acquisition unit M102 may perform Step S562 at an arbitrary stage (for example, the first stage in Step S220 in FIG. 9) after Step S560, instead of in Step S560.

Steps S564, S565, and S566 are the same as Steps S400, S410, and S420 in FIG. 12. In Step S567, the corrected data generation unit M104 calculates the corrected dot tone value Vc by using the dot tone value Vb, the amplitude coefficient Amc, and the amplitude CAm. In the present embodiment, the corrected dot tone value Vc is calculated according to the following equation:

Vc=Vb−CAm*Amc

As apparent from this equation, the corrected dot tone value Vc is decreased with the increasing amplitude CAm. The corrected dot tone value Vc is decreased with the increasing amplitude coefficient Amc. The decrease in the corrected dot tone value Vc means the increase in the target error value Ea calculated in Step S570 of FIG. 15. Since the increase in the target error value Ea increases the error value Et propagated from the target pixel to the surrounding pixels, the dots having higher densities are likely to be formed in the surrounding pixels. Since the amplitude coefficient Amc in the first-type areas A1 is larger than that in the second-type areas A2, the cyan density can be increased in the first-type areas A1, compared with the second-type area A2. As a result, it is possible to reduce the difference in the cyan density between the first-type areas A1 and the second-type areas A2. In general, since the amount of correction (CAm*Amc) varies with the print position in the first direction Dy, it is possible to suppress the unevenness in density caused by the deformation of the sheet 300 into the corrugated shape along the first direction Dy. In addition, the corrected dot tone value Vc is decreased with the increasing amplitude CAm. The amplitude CAm varies with the cyan tone value Cin. That is, the amount of correction varies with the cyan tone value Cin. Accordingly, it is possible to appropriately suppress the unevenness in density even if the feature of the unevenness in density varies with the cyan tone value Cin.

The dot formation states are determined in the same manner for the color components (e.g. magenta, yellow, and black) other than cyan.

As described above, in the third embodiment, the image data (i.e. the input image data) to be subjected to the correction process Sc2 (FIG. 14) is image data (e.g. bitmap data) in which the colors are represented with the tone values of the CMYK color components (the ink color tone values). The corrected data generation unit M104 identifies the amount of correction (e.g. the amplitude CAm*the amplitude coefficient Amc) based on the ink color tone values (for example, the cyan tone value Cin) of the target pixel and the position Py of the target pixel in the first direction Dy, and determines the dot formation state of the target pixel in accordance with the error diffusion method using the identified amount of correction. Accordingly, it is possible to appropriately correct the density of the printed image. In particular, in the present embodiment, the amount of correction is used in the determination of the error value of the target pixel (the target error value Ea). Accordingly, it is possible to correct the dot formation state in accordance with the amount of correction. In addition, since the amount of correction used in the determination of the dot formation state in accordance with the error diffusion method varies with the print position of the target pixel in the first direction Dy, it is possible to suppress the unevenness in density caused by the deformation of the sheet 300 into the corrugated shape along the first direction Dy. Furthermore, since the amount of correction varies with the ink color tone values of the target pixel (for example, the amount of correction of cyan varies with the cyan tone value Cin), it is possible to appropriately suppress the unevenness in density even if the feature of the unevenness in density varies with the ink color tone values.

The configuration excluding the image data to be subjected to the image correction Sc and excluding the content of the image correction Sc is the same as that in the first embodiment. Accordingly, the third embodiment has various advantages similar to those in the first embodiment.

The corrected dot tone value Vc is not limitedly calculated by the above equation and may be calculated by various equations in which the dot tone value is corrected in accordance with the amount of correction (e.g. CAm*Amc). For example, the corrected dot tone value Vc may be calculated according to the following equation:

Vc=Vb−CAm*Amc*(Vb/Vbmax)

where Vbmax denotes a maximum dot tone value, which is the maximum value among the dot tone values Vb of the multiple dot formation states. The ratio (Vb/Vbmax) given to the amount of correction indicates the density ratio of the determined dot formation state to the maximum dot formation state. In the present embodiment, the maximum dot tone value Vbmax is the dot tone value Vb (=255) of the large dot. Using such a ratio allows the corrected data generation unit M104 to use the amount of correction appropriate for the dot tone value Vb.

The amount of correction may be used in the determination of the dot formation state of the target pixel. For example, the corrected data generation unit M104 may determine the dot formation state of the target pixel on the basis of the relationship in magnitude between a second tone value resulting from addition of the amount of correction to the first tone value Va and the three threshold values Th1 to Th3. The total number of the dot formation states is not limited to four, and various numbers (e.g. two) that is smaller than the number of tones (e.g. 256 in the present embodiment) in the CMYK pixel data and that is larger than or equal to two may be adopted as the total number of the dot formation states.

D. Fourth Embodiment

Figure 17:
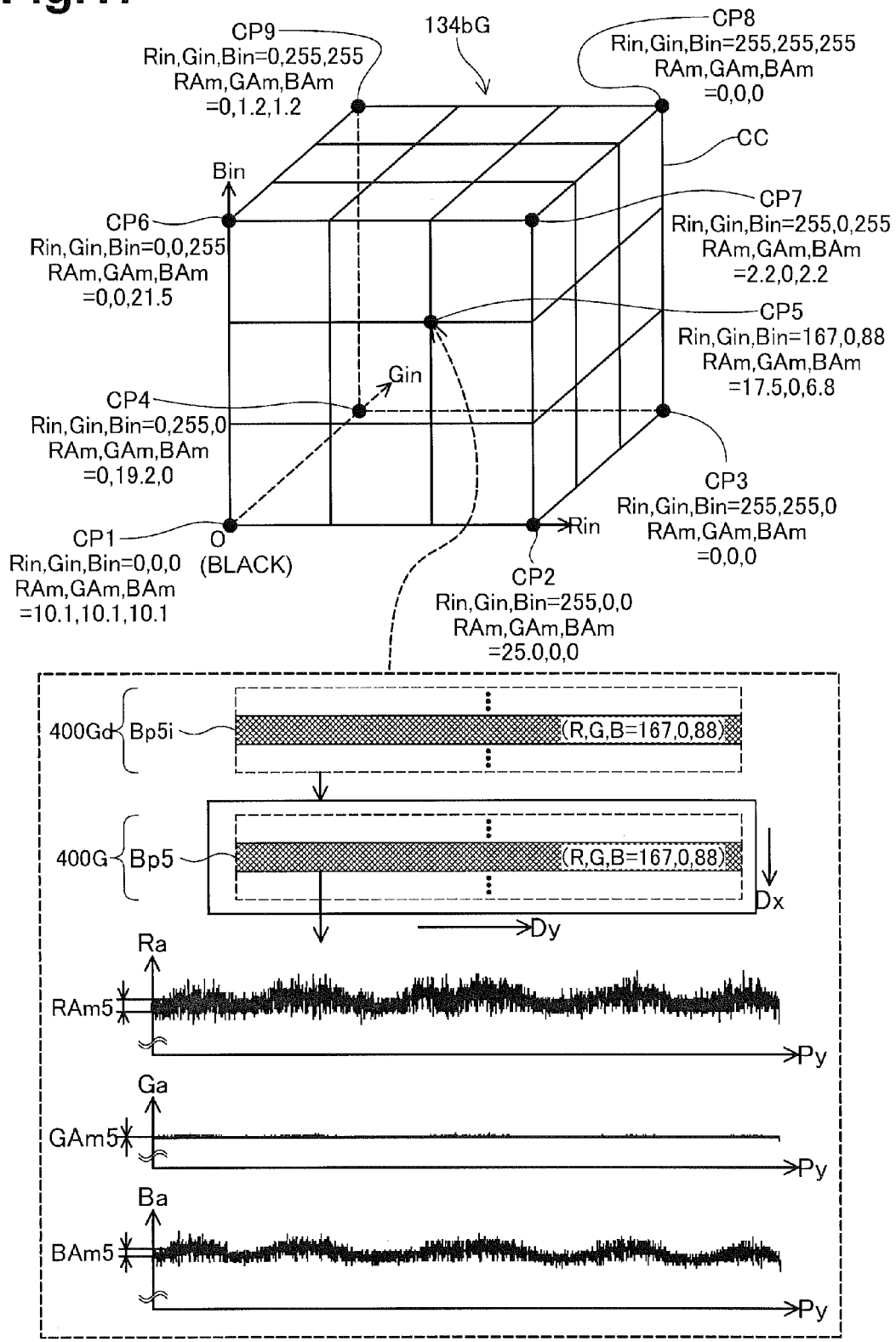
FIG. 17 is a schematic diagram showing amplitude data 134*b*G in a fourth embodiment.

FIG. 17 includes a schematic diagram showing amplitude data 134bG in a fourth embodiment. In the fourth embodiment, the image correction Sc is performed in Step ScA in FIG. 9, as in the first embodiment. However, the RGB tone values are corrected without using the luminance value in the fourth embodiment, unlike the first embodiment shown in FIGS. 5A and 5B, FIG. 6, and FIG. 8. The amplitude used in the correction is determined in accordance with the tone values Rin, Gin, and Bin of the target pixel (that is, the color of the target pixel), instead of the luminance value Yin. The amplitude used in the correction is prepared for every RGB color component. The amplitude coefficient data 134a is the same as that in the first embodiment. The correction data acquisition unit M102 (FIG. 1) acquires the amplitude coefficient data 134a and the amplitude data of each of red, green, and blue in Step Sc1 of the image correction Sc. The content of the process other than the image correction Sc and the configuration of the printing apparatus 600 are the same as those in the first embodiment.

A color solid CC represented by the three RGB tone values Rin, Gin, and Bin is shown in an upper part in FIG. 17. The color represented by the input image data is represented by a point (also referred to as a color point) in the color solid CC. The amplitude data 134bG defines amplitudes RAm, GAm, and BAm for RGB in each of multiple color points determined in advance. The multiple color points include various chromatic color points, in addition to achromatic color points. The tone values and the amplitudes of color points CP1 to CP9, among the multiple color points included in the amplitude data 134bG, are shown in the upper part in FIG. 17. For example, a fifth color point CP5 has tone values of (Rin, Gin, Bin)=(167, 0, 88) and an amplitude of (RAm, GAm, BAm)= (17.5, 0, 6.8). The amplitudes of the multiple color points are determined by using the test images including the reference images prepared for the respective color points. The process of generating the correction data is the same as that in the first embodiment shown in FIG. 4.

Test image data 400Gd is shown in a lower part in FIG. 17. The test image data 400Gd represents multiple reference images associated with the multiple color points included in the amplitude data 134bG. One-to-one correspondence is established between the color points and the reference images. The reference images in the present embodiment differ from the reference images in FIG. 5A only in that the reference images in the present embodiment have the colors of the corresponding color points, instead of gray. A fifth reference image Bp5i associated with the fifth color point CP5 is shown in the lower part in FIG. 17. The fifth reference image Bp5i is a uniform image represented by the same RGB tone values as those of the fifth color point CP5.

A printed test image 400G is shown in the lower part in FIG. 17. The printed test image 400G is formed by printing the test image data 400Gd, as in the first embodiment shown in FIG. 4. A printed fifth reference image Bp5 associated with the fifth reference image Bp5i is shown in the lower part in FIG. 17. The printed fifth reference image Bp5 is printed across the first-type areas A1 and the second-type areas A2, although not shown. The density of a printed image in the first-type areas A1 is lower than that in the second-type areas A2 (the printed image in the first-type areas A1 is brighter than that in the second-type areas A2).

Graphs shown in the lower part in FIG. 17 show the dependency on the position of average tone values Ra, Ga, and Ba for RGB of the scanned data. The scanned data is generated by optically scanning the printed test image 400G, as in the first embodiment in FIG. 4. Unlike the first embodiment in FIG. 6, the average tone values Ra, Ga, and Ba of the RGB color components are calculated, instead of the average luminance value Ya, in the present embodiment. Then, the amplitudes RAm, GAm, and BAm of the RGB color components are calculated. The graphs shown in the lower part in FIG. 17 are acquired from the printed fifth reference image Bp5. Amplitudes RAm5, GAm5, and BAm5 of the RGB color components are used as the amplitude associated with the fifth color point CP5.

If the pixel value of the RGB image data to be corrected represents a color different from multiple colors of the multiple color points determined in advance, the interpolation using multiple color points around the color is performed to calculate the amplitudes RAm, GAm, and BAm of the RGB color components. The correction is performed according to the following equations:

$$Rc = Rin - RAm * Amc$$

$$Gc = Gin - GAm * Amc$$

$$Bc = Bin - BAm * Amc$$

where Rin, Gin, and Bin denote the RGB tone values before the correction, and Rc, Gc, and Bc denote the RGB tone values after the correction. These equations are similar to the equation to calculate the corrected luminance value Yc in the first embodiment. The corrected tone values Rc, Gc, and Bc are decreased with the increasing amplitudes RAm, GAm, and BAm. The corrected tone values Rc, Gc, and Bc are decreased with the increasing amplitude coefficient Amc. The density of the printed image is increased (the printed image is made deeper) with the decreasing corrected tone values Rc, Gc, and Bc. Accordingly, the density of the printed image in the first-type areas A1 is increased by the correction in the present embodiment, as in the first embodiment. As a result, the unevenness in density is suppressed.

The amplitude data 134bG defines the amplitudes RAm, GAm, and BAm for every RGB color component in the present embodiment. In other words, the correction is performed for every RGB color component. Accordingly, it is possible to realize detailed correction, compared with the correction of the luminance value. As a result, it is possible to more appropriately suppress the unevenness in density of the printed image.

The amplitude data 134bG defines the amplitudes RAm, GAm, and BAm for the multiple achromatic color points and the multiple chromatic color points in the present embodiment. In other words, the amplitude data 134bG defines the amplitudes RAm, GAm, and BAm for every combination of the RGB color components. Accordingly, it is possible to suppress the unevenness in density of the printed image of various colors.

The configuration excluding the correction for every RGB color component in the correction process is the same as that in the first embodiment. Accordingly, the fourth embodiment has various advantages similar to those in the first embodiment.

E. Fifth embodiment

Figure 18:
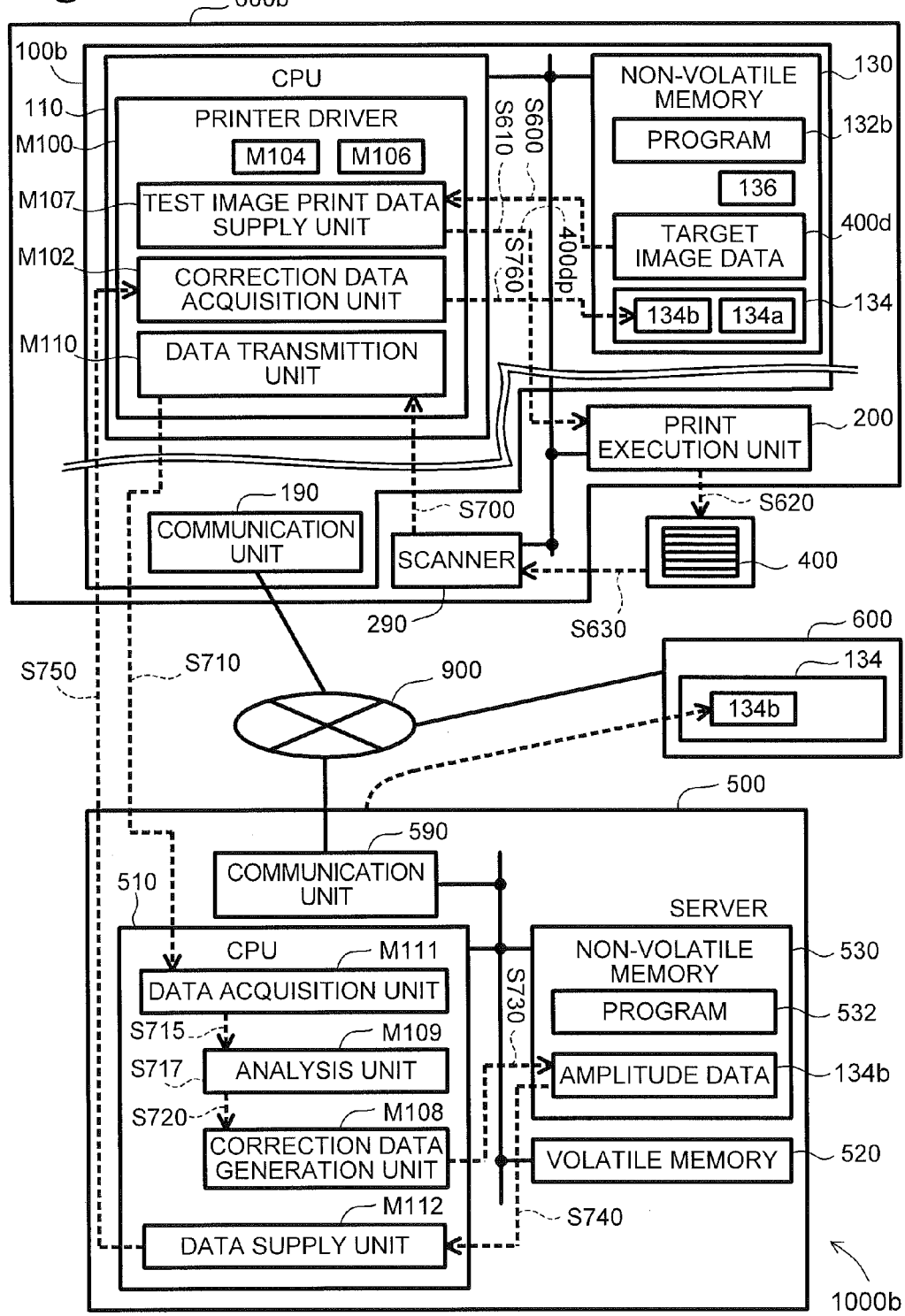
FIG. 18 is a block diagram showing the configuration of a printing system 1000*b* according to a fifth embodiment.

FIG. 18 is a block diagram showing the configuration of a printing system 1000b according to a fifth embodiment. The printing system 1000b includes a network 900, a printing apparatus 600b, and a server 500. The printing apparatus 600b is connected to the server 500 over the network 900. In the present embodiment, the printing apparatus 600b prints a test image and generates the scanned data. The server 500 acquires the scanned data from the printing apparatus 600b so as to generate the amplitude data 134b. The printing apparatus 600b acquires the amplitude data 134b from the server 500 to use the amplitude data 134b in the printing. The outline of the process of generating the amplitude data 134b by using the test image is the same as that in the first embodiment in FIG. 4. The generation of the amplitude data 134b that is the same as in the first embodiment will be exemplified here. The printing process performed by the printing apparatus 600b is the same as that in the first embodiment. The amplitude coefficient data 134a is incorporated in the printing apparatus 600b in advance, as in the above embodiments.

The configuration of the printing apparatus 600b will now be described. The printing apparatus 600b results from addition of modifications to generate the amplitude data 134b using the test image to the printing apparatus 600 in FIG. 1. The modifications for the printing apparatus 600b in the present embodiment are as follows:

(A) The functions of a test image print data supply unit M107 and a data transmission unit M110 are added to the function of the CPU 110 of a control unit 100b.
(B) A scanner 290 is added to the printing apparatus 600b.
(C) The test image data 400d is stored in the non-volatile memory 130.

In the present embodiment, the scanner 290 is a general-purpose optical scanner that optically scans various sheets. The hardware configuration of the control unit 100b is the same as that of the control unit 100 in FIG. 1. The remaining configuration of the printing apparatus 600b is the same as that of the printing apparatus 600 in FIG. 1 (part of the configuration is omitted in FIG. 18). The communication unit 190 is connected to the network 900.

The server 500 is a computer including a CPU 510, a volatile memory 520 such as a DRAM, a non-volatile memory 530 such as an EEPROM, and a communication unit 590. The communication unit 590 is an interface for connection to the network 900. The non-volatile memory 530 stores a program 532. The CPU 510 executes the program 532 to realize the functions of a data acquisition unit M111, an analysis unit M109, a correction data generation unit M108, and a data supply unit M112 (the functions will be described in detail below).

The generation of the amplitude data 134b will now be described. The printing apparatus 600b prints a test image in response to an instruction from the user. Referring to FIG. 18, in Step S600, the test image print data supply unit M107 acquires the test image data 400d from the non-volatile memory 130. In Step S610, the test image print data supply unit M107 converts the test image data 400d into print data 400dp and supplies the print data 400dp (which may also be referred to as "test image print data 400dp") to the print execution unit 200. The original test image data 400d is the same as the test image data 400d in FIG. 5A. The test image print data 400dp is generated by using the test image data 400d without the density correction. The test image print data 400dp represents an image having no unevenness in density, like the test image 400i (FIG. 5) corresponding to the test image data 400d. The conversion from the test image data 400d into the test image print data 400dp may be performed by the corrected data generation unit M104.

In Step S620, the print execution unit 200 prints the test image in accordance with the received test image print data 400dp. In Step S630, the user uses the scanner 290 to scan the printed test image 400. The scanner 290 generates the scanned data representing the printed test image 400. The scanner 290 may be an apparatus dedicated to scanning of the printed test image 400. For example, a scanner fixed to the print head 250 (FIG. 2) may advance the scanning of the printed test image 400 in parallel to the printing of the test image.

In Step S700, the data transmission unit M110 acquires the scanned data from the scanner 290. In Step S710, the data transmission unit M110 transmits the scanned data to the server 500 over the network 900. In Step S715, the data acquisition unit M111 in the server 500 supplies the scanned data acquired over the network 900 to the analysis unit M109. In Step S717, the analysis unit M109 analyzes the scanned data to calculate the amplitudes Am1 to Am10 (FIG. 6). In Step S720, the correction data generation unit M108 uses the calculated amplitudes Am1 to Am10 to generate the amplitude data 134b. The amplitude data 134b is an example of correction definition data that defines at least part of the correction integrated data 134. In Step S730, the correction data generation unit M108 stores the generated amplitude data 134b in the non-volatile memory 530.

In Step S740, the data supply unit M112 acquires the amplitude data 134b from the non-volatile memory 530. In Step S750, the data supply unit M112 transmits the amplitude data 134b to the printing apparatus 600b over the network 900. In Step S760, the correction data acquisition unit M102 of the printing apparatus 600b acquires the amplitude data 134b from the server 500 and stores the acquired amplitude data 134b in the non-volatile memory 130. The amplitude coefficient data 134a is stored in the non-volatile memory 130 in advance. In Step Sc1 of FIG. 9, the correction data acquisition unit M102 acquires the correction integrated data 134 from the non-volatile memory 130. The correction integrated data 134 is data that is generated by using the result of the analysis of the printed test image 400.

As described above, the printing apparatus 600b prints the test image for the generation of the amplitude data 134b. The correction data (specifically, the amplitude data 134b) generated in accordance with the printed test image 400 printed by the print execution unit 200 is used in the correction process. Accordingly, the printing apparatus 600b is capable of performing the correction appropriate for the print execution unit 200 of the printing apparatus 600b. As a result, it is possible to appropriately suppress the unevenness in density of the printed image.

The server 500 includes the data acquisition unit M111 that acquires the scanned data of the printed test image 400, the analysis unit M109 that analyzes the scanned data, the correction data generation unit M108 that generates the amplitude data 134b using the result of the analysis, and the data supply unit M112 that supplies the amplitude data 134b to the control unit 100b of the printing apparatus 600b. Accordingly, the server 500 is capable of appropriately supplying the amplitude data 134b by utilizing the scanned data of the printed test image 400. The amplitude data 134b is an example of the correction definition data that defines at least part of the correction integrated data 134.

The data supply unit M112 of the server 500 may supply the amplitude data 134b not only to the printing apparatus 600b that has printed the test image but also to another printing apparatus (for example, the printing apparatus 600 in the first embodiment). In either case, the data acquisition unit M111 of the server 500 preferably acquires the scanned data over the network 900 connected to the communication unit 590 and the data supply unit M112 of the server 500 preferably supplies the amplitude data 134b over the network 900. This allows the server 500 to appropriately supply the amplitude data 134b over the network 900.

The printing apparatus 600b may not include the scanner 290 and the data transmission unit M110. In this case, a scanner provided separately from the printing apparatus 600b may be used to generate the scanned data.

The correction data generation unit M108 may generate the correction integrated data 134 including the amplitude data 134b and the amplitude coefficient data 134a and the data supply unit M112 may supply the correction integrated data 134 to the printing apparatus 600b. In this case, the data (e.g. the correction integrated data 134) generated by the correction data generation unit M108 is an example of the correction definition data that defines at least part (all in the present embodiment) of the correction integrated data 134. The test image and the amplitude data in the first embodiment are not limitedly used and the test image and the amplitude data in the other embodiments described above may be used.

F. Sixth Embodiment

Figure 19:
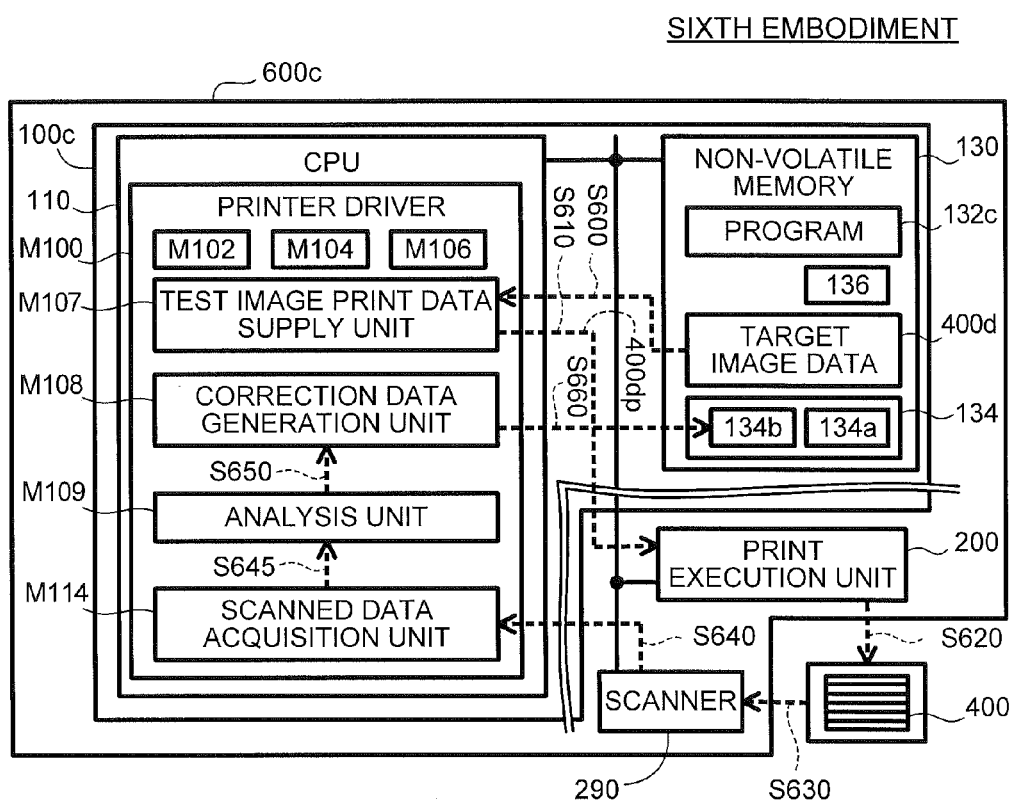
FIG. 19 is a block diagram showing the configuration of a printing apparatus 600*c* according to a sixth embodiment.

FIG. 19 is a block diagram showing the configuration of a printing apparatus 600c according to a sixth embodiment. In the present embodiment, the printing apparatus 600c prints the test image, generates the scanned data, analyzes the scanned data, and generates the amplitude data 134b. The printing apparatus 600c results from addition of modifications to generate the amplitude data 134b from the scanned data to the printing apparatus 600b in FIG. 18. The modifications for the printing apparatus 600c in the present embodiment are as follows:

(A) The functions of a correction data generation unit M108, an analysis unit M109, and a scanned data acquisition unit M114 are added to the function of the CPU 110 of a control unit 100c.

The correction data generation unit M108 and the analysis unit M109 are the same as the two units M108 and M109 provided in the server 500 in FIG. 18. The hardware configuration of the control unit 100c is the same as that of the control unit 100b of FIG. 18. The remaining configuration of the printing apparatus 600c is the same as that of the printing apparatus 600b of FIG. 18 (part of the configuration is omitted in FIG. 19).

The generation of the amplitude data 134b will now be described. The processing in Steps S600 to S630 is the same as that in Steps S600 to S630 of FIG. 18. In Step S640, the scanned data acquisition unit M114 acquires the scanned data from the scanner 290. In Step S645, the analysis unit M109 analyzes the acquired scanned data to calculate the amplitudes Am1 to Am10 (FIG. 6). In Step S650, the correction data generation unit M108 uses the calculated amplitudes Am1 to Am10 to generate the amplitude data 134b (the second correction data 134b). In Step S660, the correction data generation unit M108 stores the generated amplitude data 134b in the non-volatile memory 130. The amplitude coefficient data 134a is stored in the non-volatile memory 130 in advance. Accordingly, the correction data generation unit M108 generates the amplitude data 134b to complete the generation of the correction integrated data 134. In the printing, the correction data acquisition unit M102 acquires the correction integrated data 134 generated by the correction data generation unit M108 from the non-volatile memory 130.

As described above, since the control unit 100c analyzes the scanned data and generates the correction data (specifically, the amplitude data 134b), the control unit 100c is capable of easily using the correction data appropriate for the print execution unit 200. The printing apparatus 600c uses the test image generated by the printing apparatus 600c to generate the amplitude data 134b (the correction integrated data 134). Accordingly, the printing apparatus 600c is capable of using the correction integrated data 134 appropriate for the print execution unit 200 of the printing apparatus 600c. The printing apparatus 600c is capable of generating the correction integrated data 134 by itself without using the server 500. As a result, it is possible to improve the user friendliness of the printing apparatus 600c.

The printing apparatus 600c may not include the scanner 290. In this case, a scanner provided separately from the printing apparatus 600c may be used to generate the scanned data. The non-volatile memory 130 may not store the amplitude coefficient data 134a in advance, and the correction data generation unit M108 may generate the correction integrated data 134 including the amplitude data 134b and the amplitude coefficient data 134a. The printing apparatus 600c may transmit the generated amplitude data 134b (or the correction integrated data 134) to a server (not shown). The server may supply the received data to another printing apparatus. The test image and the amplitude data in the first embodiment are not limitedly used and the test image and the amplitude data in the other embodiments described above may be used.

G. Seventh Embodiment

FIG. 20A is a diagram for describing another embodiment of the reference gap.

FIG. 20A show the positions on which the droplets D1 and D2 adhere and the sheet 300, as in FIG. 3B. In this embodiment, the printing apparatus 600 shown in FIG. 1 and FIG. 2 is used. A gap GPsa of the parts of the sheet pressed downward by the pressure applying portions 269, instead of the parts of the sheet supported by the high supports 265b, is used as the reference gap (a plane 300sa apart from the nozzles 250n (the nozzle plane np) by the reference gap GPsa may also be referred to as a "reference plane 300sa"). In the present embodiment, the discharge timing of the droplets D1 and D2 is adjusted on the assumption that the printing on the reference plane 300sa is performed (it is assumed in FIG. 20A that the droplets D1 and D2 form the dots at the same target position Py1 in the first direction Dy). Accordingly, the positional shift of the dots is increased with the decreasing distance of the gap, that is, with the decreasing distance between the sheet 300 and the nozzles 250n. For this reason, in the present embodiment, the density is corrected to a relatively low value in second-type areas A2a whose gap is within a specific range GRa and the density is corrected to a relatively high value in first-type areas A1a whose gap is outside the specific range GRa. A gap value within the specific range GRa is larger than or equal to the gap threshold value GPth. The specific range GRa is hatched in FIG. 20A.

The pattern of the dependency of the amplitude coefficient Amc on the position Py is equal to a pattern in which "1" and "0" of the amplitude coefficient Amc in the first embodiment in FIG. 7 are reversed. Specifically, the amplitude coefficient Amc is set to "0" at the positions Pya1 to Pya6 of the pressure applying portions 269, and is set to "1" at the positions Pyb1 to PYb7 of the high supports 265b (not shown). In other words, the amplitude coefficient Amc is set to "0" at the positions (the position Py in the first direction Dy) where the gap is equal to the reference gap GPsa on the reference plane 300sa. The amplitude Am is determined in accordance with the process shown in FIG. 4.

FIG. 20B is a diagram for describing another embodiment of the reference gap. FIG. 20B show the positions on which droplets D1a and D1b discharged from the print head 250 moving in the +Dy direction adhere, the positions on which droplets D2a and D2b discharged from the print head 250 moving in the −Dy direction adhere, and the sheet 300, as in FIG. 20A. In the present embodiment, the printing apparatus 600 shown in FIG. 1 and FIG. 2 is used. A gap GPsb at intermediate positions between the lowest parts of the pressure applying portions 269 and the upper faces of the high supports 265b is used as the reference gap (a plane 300sb apart from the nozzles 250n (the nozzle plane np) by the gap GPsb may also be referred to as a "reference plane 300sb"). The discharge timing of the droplets D1a, D1b, D2a, and D2b is adjusted on the assumption that the printing on the reference plane 300sb is performed (it is assumed in FIG. 20B that the droplets D1a and D2a form the dots at the same target position Py1a and the droplets D1b and D2b form the dots at the same target position Py1b). Accordingly, the positional shift of the dots is increased with the increasing distance between the gap and the reference gap GPsb. For this reason, in the present embodiment, the density is corrected to a relatively low value in second-type areas A2b whose gap is within a range GRb in which the absolute value of the difference between the gap and the reference gap GPsb is smaller than or equal to a specific value, and the density is corrected to a relatively high value in first-type areas A1b1 and A1b2 whose gap is outside the range GRb. The range GRb is hatched in FIG. 20B.

The dependency of the amplitude coefficient Amc on the position Py will now be described. The amplitude coefficient Amc is set to "1" at the positions Pya1 to Pya6 of the pressure applying portions 269 and at the positions Pyb1 to Pyb7 of the high supports 265b. The amplitude coefficient Amc is set to "0" at intermediate positions between the pressure applying portion 269 and the high support 265b that are adjacent to each other, specifically, at positions (the position Py in the first direction Dy) where the gap is equal to the reference gap GPsb on the reference plane 300sb. The amplitude Am is determined in accordance with the process shown in FIG. 4.

FIG. 20A and FIG. 20B are applicable to the above embodiments.

H. Modifications (1) The density of the printed image is represented by the amount of ink per unit area and has negative correlation with the brightness. Accordingly, parameters having correlation with the brightness (for example, the luminance value Y and the RGB tone values) are also the parameters representing the density. The correction of the parameter having the correlation with the brightness, instead of the parameter (for example, the ink color tone values) directly representing the density, can also be referred to as the "correction of the density." For example, image data represented in a so-called L*a*b color space may be adopted as the target for the image correction Sc and the tone value of an L* component may be corrected.

(2) In the above embodiments, the color space of the image data to be subjected to the image correction Sc (i.e. the input image data) is not limited to the RGB color space and the CMYK color space and various other color spaces (for example, a CMY color space, a YCbCr color space, and the L*a*b color space) may be adopted. The pixel density of the input image data may be different from the print resolution. For example, the image data before Step S200 of FIG. 9 (rasterization) may be the target for the image correction Sc.

(3) The configuration of the print execution unit is not limited to the configuration of the print execution unit 200 in the above embodiments and various configurations may be adopted. For example, the ink available in the print execution unit is not limited to the ink of CMYK four colors and one or more types of ink may be adopted. The positional shift of the dots described above with reference to FIGS. 3A and 3B does not limitedly occur in the case in which the bidirectional printing is adopted but also occurs in a case in which unidirectional printing is adopted. Accordingly, the image correction Sc in the above embodiments may be applied to the print execution unit that performs the unidirectional printing. The total number of the dot formation states is not limited to two or four and two or more various numbers of the dot formation states may be adopted.

(4) As shown in FIG. 2D, the gap between the nozzles 250n and the sheet 300 can be varied depending on the position in the conveying direction Dx. The gap at the positions of the nozzles 250n toward the +Dx direction is smaller than the gap at the positions of the nozzles 250n toward the −Dx direction in the above embodiments. Accordingly, in the above embodiments, the corrected data generation unit M104 may vary the amount of correction depending on the position of the nozzle 250n in the conveying direction Dx. In this case, the corrected data generation unit M104 varies the amount of correction depending on the position in the conveying direction Dx during the dot formation, in addition to the variation of the amount of correction depending on the position Py in the first direction Dy. The printing of the test image is preferably performed by the nozzle 250n having the maximum gap.

(5) In the above embodiments, the correction integrated data 134 may be prepared for each sheet type (print medium). The sheet type may be selected from general sheet types, such as gloss paper or matte paper, or may be identified with the model number of the sheet. The correction data acquisition unit M102 acquires the correction integrated data 134 associated with the sheet type. In this case, the corrected data generation unit M104 is capable of performing the correction appropriate for the sheet type.

The server (for example, the server 500 in FIG. 18) may store multiple types of correction integrated data 134 (or multiple types of amplitude data 134b) for multiple sheet types in a memory (for example, the non-volatile memory 530). The printing apparatus (for example, the correction data acquisition unit M102) may acquire the correction integrated data 134 (or the amplitude data 134b) associated with the sheet type specified by the user from the server over the network.

(6) The structure of the test image is not limited to the structures in FIGS. 5A and 5B, FIGS. 13A and 13B, and FIG. 17 in the above embodiments and various structures may be adopted. In general, the test image print data preferably represents the test image including multiple reference images that have different densities each other and that each have a constant tone value. Each of the multiple printed reference images in the printed test image preferably includes a first-type printed partial reference image printed in at least one of the multiple first-type areas and a second-type printed partial reference image printed in at least one of the multiple second-type areas. For example, the multiple reference images may be dispersedly printed in multiple sheets. Only one reference image may be printed within a partial range from the end in the −Dy direction to the end in the +Dy direction of the printable range PA (see FIG. 5B).

The analysis unit M109 and the correction data generation unit M108 preferably generate the correction data in the following manner. Specifically, the analysis unit M109 calculates the difference in density for each of the multiple printed reference images. The difference in density is represented by the scanned data acquired by optically scanning the printed test images. The difference in density indicates the difference between the density of the first-type printed partial reference image and the density of the second-type printed partial reference image. The correction data generation unit M108 generates the correction data such that the amount of correction associated with the density of each reference image represented by the test image print data is increased with the increasing the above difference in density calculated from the printed reference image, and such that the amount of correction when the print position in the first direction Dy on the sheet 300 is within the first-type areas is different from the amount of correction when the print position in the first direction Dy on the sheet 300 is within the second-type areas. With this configuration, since the correction data is generated such that the amount of correction when the print position in the first direction Dy is within the first-type areas is different from the amount of correction when the print position in the first direction Dy is within the second-type areas, it is possible to suppress the unevenness in density caused by the deformation of the sheet into the corrugated shape along the first direction. In addition, since the correction data is generated such that the amount of correction is increased with the increasing the difference in density calculated form the printed reference image, it is possible to appropriately suppress the unevenness in density even if the feature of the unevenness in density varies with the density.

(7) Although the first correction data 134*a* (the amplitude coefficient data 134*a*) is independent of the second correction data 134*b* (the amplitude data 134*b*) in the above embodiments, the corrected data generation unit M104 may use correction data resulting from combination of the first correction data 134*a* with the second correction data 134*b*. For example, the correction data may be a lookup table in which a combination of the luminance value Yin and the position Py in the first direction Dy is associated with the amount of correction.

(8) The configuration of the sheet conveying unit 260 is not limited to the one shown in FIG. 1 and FIG. 2 and various configurations may be adopted. For example, the low supports 265*a* may be omitted. The pressure applying portions 269 may be formed of various members. For example, the pressure applying portions 269 may be formed of rigid resin members or elastic members, such as plate springs. A driven roller opposing the first roller 261 may be provided, instead of the first parts 265*a*1, 265*b*1 of the supports 265*a*, 265*b*. Similarly, a driven roller opposing the second roller 262 may be provided, instead of the fifth parts 265*a*5, 265*b*5.

(9) The reference gaps GPs, GPsa, and GPsb can be identified by using the result of printing in the above embodiments. Specifically, image data representing multiple straight lines whose positions Py in the first direction Dy are different from each other (straight lines extending along conveying direction Dx) is used to perform the printing. In the print area (the position Py) whose gap is close to the reference gap, the straight lines are clearly printed because the positional shift of the dots is small. In contrast, in the print area (the position Py) whose gap is away from the reference gap, the straight lines are indistinctly printed because the positional shift of the dots is large. The gap at the position Py where the straight line is clearly printed is the reference gap. The first-type areas and the second-type areas can be identified in the following manner. Specifically, the absolute value of the difference between the actual gap and the identified reference gap in the first-type areas is larger than that in the second-type areas.

(10) The control unit 100, 100*b*, or 100*c* and the print execution unit 200 may be realized as separate apparatuses housed in different cases in the above embodiments. Multiple computers communicable with each other over a network may share the functions required for the image processing for the printing to totally provide the functions required for the image processing for the printing in the above embodiments. As described above, the print control apparatus (for example, the control units 100, 100*b*, and 100*c*) may be a computer system including the multiple computers (a technology to use such a computer system is also called cloud computing).

(11) Part of the configuration realized by the hardware in the above embodiments may be replaced with software, or part of the configuration or the entire configuration realized by the software may be replaced with hardware. For example, the function of the corrected data generation unit M104 in FIG. 1 may be realized by a dedicated hardware circuit including logic circuits.

When part or all of the functions of the present invention is realized by software, the software (computer programs) may be provided in the form of a computer readable recording medium. Not only portable recording media, such as a memory card and a compact disk-read only memory (CD-ROM), but also internal memories in the computer, such as various random access memories (RAMs) and read only memories (ROMs), and an external storage apparatus connected to the computer, such as a hard disk drive, may be used as the "computer-readable recording medium."

(12) According to another aspect, a provision apparatus may be utilized. The provision apparatus may be configured to provide data for a print control process to a print control apparatus, wherein the print control apparatus is configured to cause a print execution unit to perform printing, and the print execution unit comprises: a sheet conveying unit configured to convey a sheet in a second direction intersecting with a first direction, in a state in which the sheet is deformed into a corrugated shape along the first direction; a print head including a plurality of nozzles each discharging a droplet; a head moving unit configured to move the print head in parallel to the first direction; and a print head driver configured to drive the print head, while the print head is moving, to cause the print head to discharge the droplet to the sheet deformed into the corrugated shape. The provision apparatus may comprise: a data acquiring unit configured to acquire scanned data generated by optically scanning a printed test image printed by the print execution unit using test image print data representing a test image, the test image print data representing the test image including a plurality of reference images that have different densities and that each have a constant tone value, each of a plurality of printed reference images in the printed test image including a first-type printed partial reference image printed in at least one of a plurality of first-type areas on the sheet and a second-type printed partial reference image printed in at least one of a plurality of second-type areas on the sheet, the plurality of first-type areas and the plurality of second-type areas extending along the second direction and being alternately arranged along the first direction; an analyzing unit configured to analyze the scanned data; a correction data generating unit configured to generate correction definition data by using a result of the analysis by the analyzing unit, wherein the correction definition data defines at least part of correction data utilized in the print control process, and a data supplying unit configured to supply the correction definition data to the print control apparatus.

With above configuration, it is possible to appropriately supply the correction definition data by using the scanned data of the printed test image.

The provision apparatus according to the above example may further comprise: an interface for connection to a network, wherein the data acquiring unit is configured to acquire the scanned data via the network, and wherein the data supplying unit is configured to supply the correction definition data via the network.

With the above configuration, it is possible to appropriately supply the correction data via the network.

While features have been described in connection with various example structures and illustrative embodiments, it will be understood by those skilled in the art that other variations and modifications of the structures, configurations, and embodiments described above may be made without departing from the scope of the disclosure. For example, this application comprises any possible combination of the various elements and features disclosed herein, and the particular elements and features presented in the claims and disclosed above may be combined with each other in other ways within the scope of the application, such that the application should be recognized as also directed to other embodiments comprising any other possible combinations. Other structures, configurations, and embodiments will be apparent to those skilled in the art from a consideration of the specification or practice of the features disclosed herein. It is intended that the specification and the described examples are illustrative with the true scope of this patent being defined by the following claims.

What is claimed is:

1. A printing apparatus comprising:
   a print control unit: and
   a print execution unit,
   wherein the print control unit comprises:
   a processor configured to control ink droplet printing on a sheet corrugated along a first direction intersecting a second direction that is a conveying direction, and to perform the following:
   generate corrected image data from input image data by performing a correction process using correction data; and
   supply the corrected image data to the print execution unit,
   wherein the correction process is performed using the input image data such that a density of a plurality of first-type printed partial images printed in a plurality of first-type areas on a sheet is different from a density of a plurality of second-type printed partial images printed in a plurality of second-type areas on the sheet on an assumption that the input image data represents an image having constant tone values for a flat sheet,
   wherein the plurality of first-type areas and the plurality of second-type areas extend along the second direction and are alternately arranged along the first direction, and
   wherein the print execution unit comprises a sheet conveying unit having:
   a plurality of supports that are arranged along the first direction at positions opposing a print head that moves in parallel to the first direction and that support the sheet from a lower face of the sheet; and
   a plurality of pressure applying portions configured to press the sheet downward from an upper face of the sheet, a position of each of the pressure applying portions in the first direction being arranged between two adjacent supports among the plurality of supports, wherein the plurality of supports and the plurality of pressure applying portions are configured to cause the corrugation of the sheet during printing.

2. The printing apparatus according to claim 1,
   wherein the first-type areas are areas in which a gap between the sheet and print head nozzles is outside a specific range, and
   wherein the second-type areas are areas in which the gap is within the specific range.

3. The printing apparatus according to claim 2,
   wherein the specific range is a range in which the gap is smaller than a predetermined threshold value.

4. The printing apparatus according to claim 1,
   wherein the processor is configured to perform the correction process using the input image data such that the density of the plurality of first-type printed partial images is higher than the density of the plurality of second-type printed partial images on the assumption that the input image data represents the image having constant tone values for a flat sheet.

5. The printing apparatus according to claim 1,
   wherein the input image data represents colors of pixels with tone values of RGB color components,
   wherein the correction data defines an amount of correction that varies depending on RGB tone values of a pixel and a print position of the pixel in the first direction, and
   wherein the processor is configured to:
   refer to the correction data so as to identify an amount of correction by using RGB tone values of a target pixel and a print position of the target pixel in the first direction;
   calculate corrected RGB tone values in accordance with the identified amount of correction; and
   generate the corrected image data in accordance with the corrected RGB tone values.

6. The printing apparatus according to claim 1,
   wherein the input image data represents colors of pixels with ink-color tone values representing tone values of color components of ink droplets,
   wherein the correction data defines an amount of correction that varies depending on ink-color tone values of a pixel and a print position of the pixel in the first direction, and
   wherein the processor is configured to:
   refer to the correction data so as to identify an amount of correction by using ink-color tone values of a target pixel and a print position of the target pixel in the first direction;
   calculate corrected ink-color tone values in accordance with the identified amount of correction; and
   generate the corrected image data in accordance with the corrected ink-color tone values.

7. The printing apparatus according to claim 1,
   wherein the input image data represents colors of pixels with ink-color tone values representing tone values of color components of ink droplets,
   wherein the correction data defines an amount of correction that varies depending on ink-color tone values of a pixel and a position of the pixel in the first direction,
   wherein the corrected image data represents a dot formation state of a pixel, and
   wherein the processor is configured to:
   refer to the correction data so as to identify an amount of correction by using ink-color tone values of a target pixel and a position of the target pixel in the first direction; and
   determine a dot formation state of the target pixel in accordance with error diffusion method using the identified amount of correction.

8. The printing apparatus according to claim 7,
   wherein the processor is configured to:
   determine the dot formation state of the target pixel and an error value of the target pixel depending on the dot formation state of the target pixel, by using the ink-color tone values of the target pixel and error values of surrounding pixels around the target pixel; and utilize the identified amount of correction for the determination of the error value of the target pixel or for the determination of the dot formation state of the target pixel.

9. The printing apparatus according to claim 1, wherein the processor is further configured to perform the following:
supply test image print data representing a test image to the print execution unit; and
acquire the correction data by using a result of analysis of a printed test image printed by the print execution unit.

10. The printing apparatus according to claim 9, wherein the processor is further configured to perform the following:
acquire scanned data generated by optically scanning the printed test image;
analyze the scanned data; and
generate the correction data by using a result of the analysis.

11. The printing apparatus according to claim 10,
wherein the test image print data represents the test image including a plurality of reference images that have different densities and that each have a constant tone value,
wherein each of a plurality of printed reference images in the printed test image includes a first-type printed partial reference image printed in at least one of the plurality of first-type areas and a second-type printed partial reference image printed in at least one of the plurality of second-type areas,
wherein the processor is configured to calculate a difference in density between the first-type printed partial reference image and the second-type printed partial reference image, which is represented by the scanned data, for each of the plurality of printed reference images, and
wherein the processor is configured to generate the correction data such that an amount of correction associated with the density of each reference image represented by the test image print data is increased with an increasing difference in density calculated with the printed reference image, and such that an amount of correction when the print position on the sheet in the first direction is within the first-type areas is different from an amount of correction when the print position on the sheet in the first direction is within the second-type areas.

12. The printing apparatus according to claim 1, wherein the correction process is performed using the input image data by changing at least one of values of pixels forming the plurality of first-type printed partial images and values of pixels forming the plurality of second-type printed partial images based on the correction data the print execution unit.

* * * * *